United States Patent
Shih et al.

(10) Patent No.: US 11,739,642 B2
(45) Date of Patent: Aug. 29, 2023

(54) MANUFACTURING METHOD OF 3-DIMENSIONAL PLASTIC IMPELLER OF CENTRIFUGAL PUMP AND THE IMPELLER

(71) Applicant: ASSOMA INC., Taoyuan (TW)

(72) Inventors: Chih-Hsien Shih, Taoyuan (TW); Chih-Kuan Shih, Taoyuan (TW); Huan-Jan Chien, Hsinchu County (TW); Shu-Yen Chien, Pingtung (TW); Chin-Cheng Wang, Yilan County (TW); Yuan Hung Lin, Taoyuan (TW); Peng-Hsiang Chen, Taichung (TW)

(73) Assignee: ASSOMA INC., Taoyuan (TW)

( * ) Notice: Subject to any disclaimer, the term of this patent is extended or adjusted under 35 U.S.C. 154(b) by 0 days.

(21) Appl. No.: 16/972,681

(22) PCT Filed: Sep. 25, 2019

(86) PCT No.: PCT/CN2019/107820
§ 371 (c)(1),
(2) Date: Dec. 7, 2020

(87) PCT Pub. No.: WO2021/056258
PCT Pub. Date: Apr. 1, 2021

(65) Prior Publication Data
US 2022/0213897 A1    Jul. 7, 2022

(51) Int. Cl.
*F04D 29/22*    (2006.01)
*F04D 1/00*    (2006.01)
(Continued)

(52) U.S. Cl.
CPC .......... *F04D 29/2222* (2013.01); *B22F 5/009* (2013.01); *B23P 15/006* (2013.01);
(Continued)

(58) Field of Classification Search
CPC .. F04D 29/2222; F04D 29/284; F04D 29/023; F04D 29/2227; F04D 29/026;
(Continued)

(56) References Cited

U.S. PATENT DOCUMENTS 2,220,669 A  * 11/1940 Allen .................. F04D 29/2227
                                                 416/241 A
10,016,808 B2    7/2018 Vestermark Vad
(Continued)

FOREIGN PATENT DOCUMENTS

CN    1908443 A    2/2007
CN    102264525 A   11/2011
(Continued)

OTHER PUBLICATIONS

International Search Report PCT/CN2019/107820, dated Feb. 13, 2020.
Karassik, Igor J. et al., "Pump Handbook Third Edition", 2001, pp. 2.22 to 2.41, McGraw-Hill.

*Primary Examiner* — Peter J Bertheaud
(74) *Attorney, Agent, or Firm* — Locke Lord LLP; Tim Tingkang Xia, Esq.

(57) ABSTRACT

The disclosed embodiment is related to a manufacturing method of a die-formed 3-dimensional plastic impeller of a centrifugal pump and the impeller manufactured thereby, including a mold for twisted blade and a mold for impeller outlet, the mold for twisted blade is configured to form a twisted blade portion of each blade of the impeller, the mold for impeller outlet is configured to form a rear portion of each blade, a hub rim part of the impeller, and a shroud rim part of the impeller so that the hub rim part, the shroud rim part, and the blades are formed in a single piece at the same molding process.

13 Claims, 24 Drawing Sheets

(51) Int. Cl.
*F04D 29/28* (2006.01)
*F04D 29/02* (2006.01)
*B23P 15/00* (2006.01)
*B22F 5/00* (2006.01)
*F01D 5/04* (2006.01)
*B29L 31/08* (2006.01)
*B23K 101/00* (2006.01)

(52) U.S. Cl.
CPC ............... *F01D 5/048* (2013.01); *F04D 1/00* (2013.01); *F04D 29/023* (2013.01); *F04D 29/026* (2013.01); *F04D 29/22* (2013.01); *F04D 29/2227* (2013.01); *F04D 29/284* (2013.01); *B23K 2101/001* (2018.08); *B29L 2031/08* (2013.01); *B29L 2031/087* (2013.01); *F05D 2230/23* (2013.01); *F05D 2300/43* (2013.01); *Y10T 29/4932* (2015.01); *Y10T 29/49316* (2015.01); *Y10T 29/49321* (2015.01); *Y10T 29/49329* (2015.01)

(58) Field of Classification Search
CPC .......... F04D 1/00; F04D 29/22; F04D 29/222; B23P 15/006; F05D 2300/43; F05D 2230/23; B29L 2031/08; B29L 2031/087; B22F 5/009; B23K 2101/001; Y10T 29/49316; Y10T 29/4932; Y10T 29/49321; Y10T 29/49329; F01D 5/048

See application file for complete search history.

(56) References Cited

U.S. PATENT DOCUMENTS

| | | | |
|---|---|---|---|
| 2011/0318183 A1 | 12/2011 | Noronha et al. | |
| 2015/0030457 A1* | 1/2015 | Yamamoto | F04D 29/2227 416/234 |
| 2018/0243955 A1 | 8/2018 | Ishikawa et al. | |

FOREIGN PATENT DOCUMENTS

| | | |
|---|---|---|
| CN | 202209308 U | 5/2012 |
| CN | 103128974 A | 6/2013 |
| CN | 203009383 U | 6/2013 |
| CN | 104131995 A | 11/2014 |
| CN | 105179304 A | 12/2015 |
| CN | 205117800 U | 3/2016 |
| CN | 105849418 A | 8/2016 |
| CN | 105927595 A | 9/2016 |
| CN | 107092763 A | 8/2017 |
| CN | 107345521 A | 11/2017 |
| CN | 107471547 A | 12/2017 |
| CN | 206753985 U | 12/2017 |
| CN | 110142930 A | 8/2019 |
| EP | 0734834 A1 | 10/1996 |
| JP | 2001355595 A | 12/2001 |
| TW | 201640027 A | 11/2016 |
| WO | 2007046565 A1 | 10/2005 |
| WO | 2014139578 A1 | 9/2014 |

\* cited by examiner

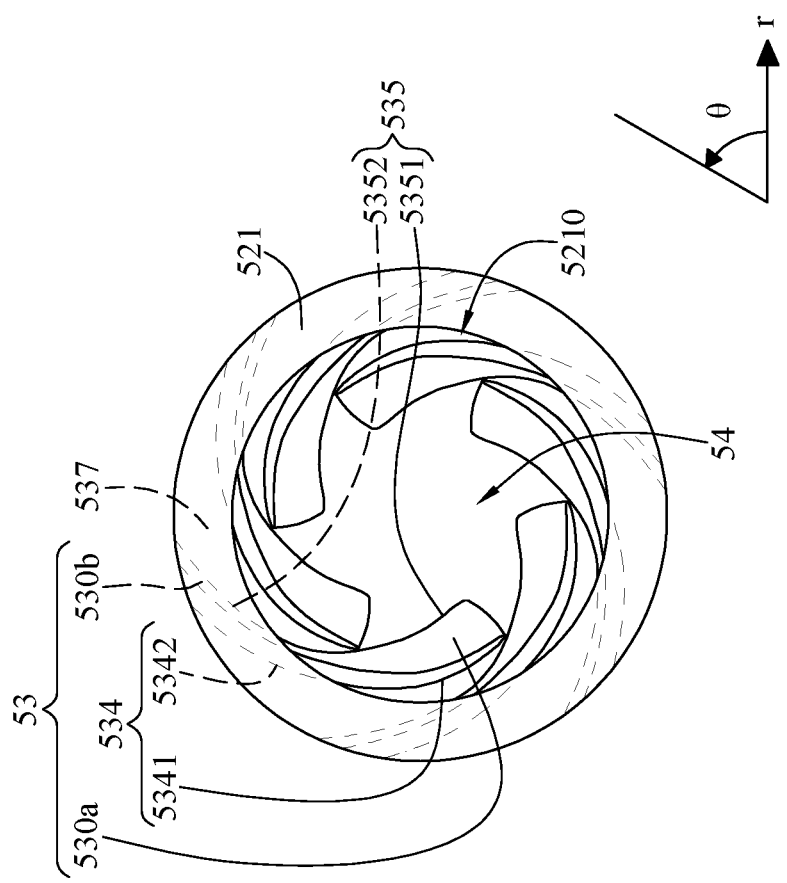
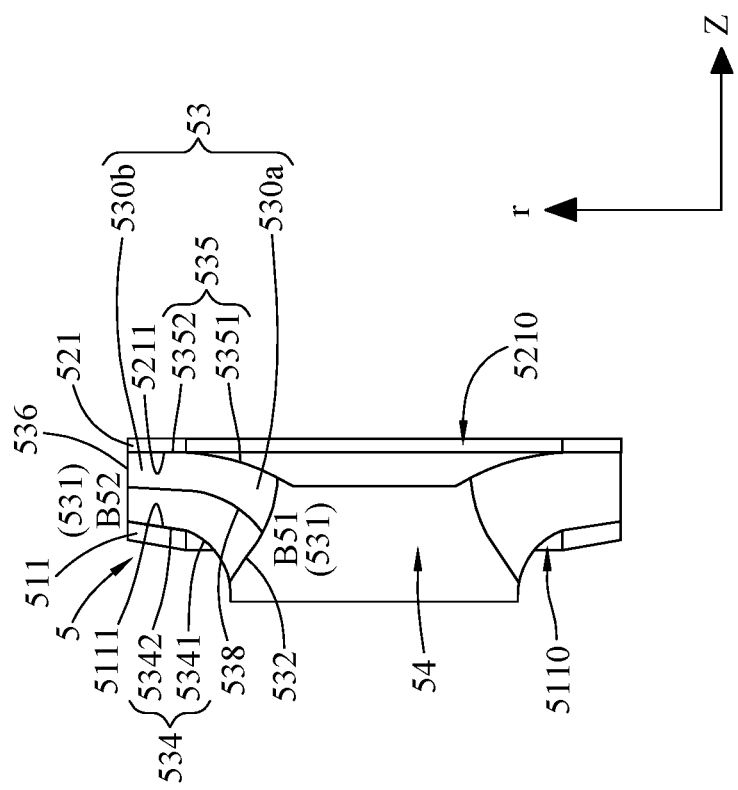
FIG. 4A
FIG. 4B

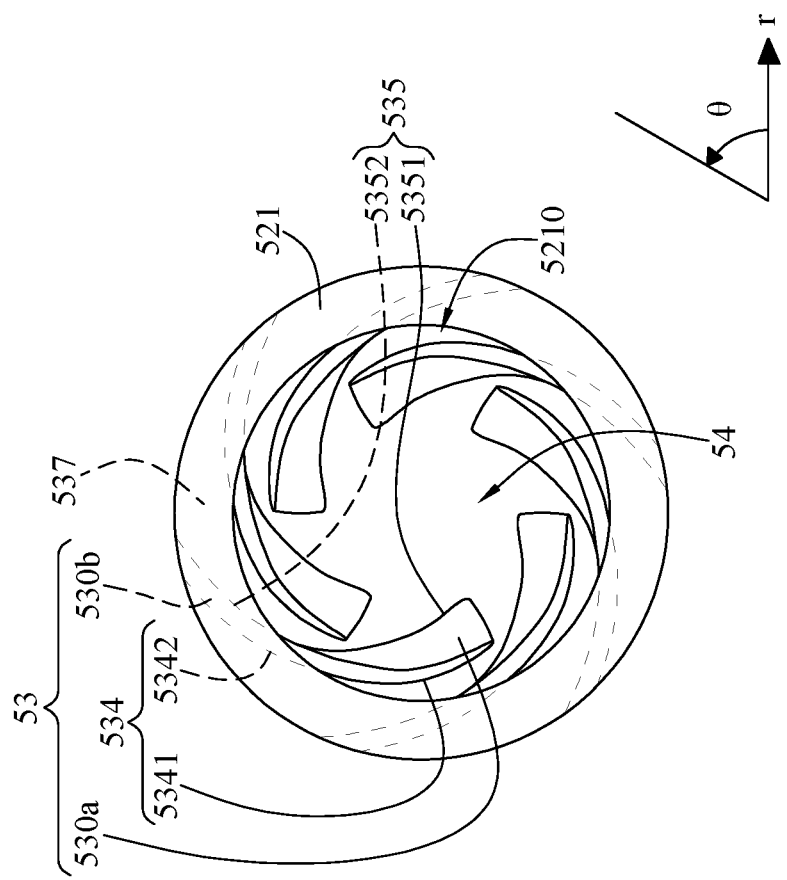
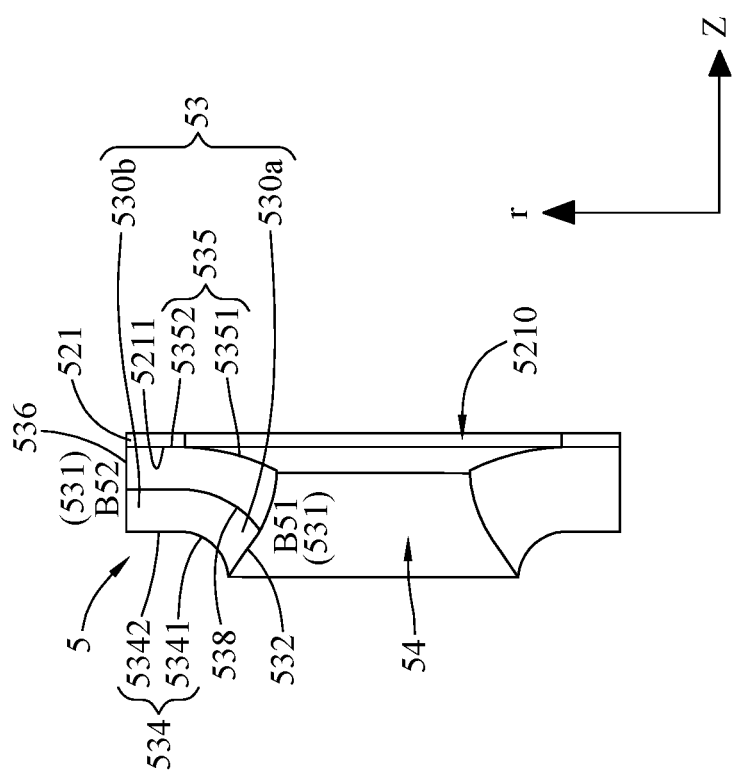
FIG. 10A
FIG. 10B

MANUFACTURING METHOD OF 3-DIMENSIONAL PLASTIC IMPELLER OF CENTRIFUGAL PUMP AND THE IMPELLER

CROSS-REFERENCE TO RELATED APPLICATIONS

This application is a U.S. National Phase entry of PCT Patent Application Serial No. PCT/CN2019/107820, filed on Sep. 25, 2019, the entire contents of which are hereby incorporated by reference.

TECHNICAL FIELD

The disclosure relates to a manufacturing method of a pump impeller, more particularly to a manufacturing method of a pump impeller made from engineering plastic material, which is adaptive to manufacture a plastic impeller having high-efficiency 3-dimensional flow channel using methods, such as injection molding or transfer molding, and is able to solve the problem that the conventional 2-dimensional impeller may be easy to produce but is low in efficiency.

BACKGROUND

Energy-saving and carbon dioxide emission reduction are getting more attention from countries, thus improving power machinery efficiency becomes a goal that manufacturers are working toward. According to the report from International Energy Agency (IEA), the power consumption of pumps is approximately 19% of the overall power consumption of motor-driven machinery. Since 2015, European Union (EU) regulates the Minimum Efficiency Index (MEI) of the water pump to be at least greater than or equal to 0.4, thus many manufacturers are working on developing high-efficiency pump that are cost-effective to manufacture.

According to reference 1 (Paul Cooper. 2001. McGraw-Hill. *PUMP HANDBOOK* (3$^{rd}$ ed.), section 2.1, Centrifugal pump theory), its FIG. 9 (Optimum geometry as a function of BEP specific speed) and FIG. 10 (Efficiency of centrifugal pumps versus specific speed) mention the parameter generally used in pump industry is called "specific speed", where the specific speed is defined as:

$$N_s = \frac{N(rpm) \times \sqrt{Q(gpm)}}{[H(ft.)]^{0.75}},$$

the reference also mentions the geometry of pump impeller, and its relationship to the operating range (flow rate (Q), head (H)), the specific speed of $$N_s = \frac{N(RPM) \times \sqrt{Q(cmm)}}{[H(m)]^{0.75}}$$

centrifugal pump approximately ranges between 380 and 1750

$$\left(\frac{rpm \times \sqrt{gpm}}{[ft.]^{0.75}}\right)_{\frac{rpm \times \sqrt{gpm}}{[ft.]^{0.75}} N_s = \frac{rpm \times \sqrt{gpm}}{[ft.]^{0.75}}},$$

an impeller having a higher specific speed, the greater the degree of twist of blade. The reference also mentions that a 2-dimensional blade is a typical blade of low specific speed, and the 2-dimensional blade has the same shape at all points along z axis, so the shroud line and hub line of the blade overlaps with each other. In contrast, in a 3-dimensional blade, the shroud line and the hub line are in different shapes and have different blade angles.

FIG. 19 (conformal transformation of blade shape: "grid-lines") of the reference 1 mentions that the grid-lines of blade shape is established by the conformal transformation method and can clearly define the variation of blade angle of different streamlines on meridional coordinate $\vec{m}$ from outlet to inlet. It can be seen that the blade angles are the same at the outlet, but closer to the inlet, the shroud line and the hub line have a greater difference in the blade angle, and the twist of the blade is greater.

The centrifugal impeller is an important element for the operation of turbomachine, and it can be used to transmit fluid including liquid and/or gas and applied to wind turbines or pumps. The centrifugal impeller of pump is installed in a volute, fluid flows into the suction of the pump housing and enters into the inlet of the impeller axially. The interior of the impeller has a plurality of radial or inclined blade flow channels defined by a plurality of curved blades. As the impeller rotates, mechanical energy is transmitted to the fluid via these blades with the help of centrifugal force and Coriolis force so as to increase the flow velocity and pressure of the fluid. With the guide of the blades, the flow of the fluid is switched from axial direction to radial direction, and then the fluid leaves the blade flow channel and enters into the flow channel of the volute, its high-speed kinetic energy is recovered as static pressure through the diffusion of the flow channel of the volute and is discharged from the outlet of the volute.

In the axial direction, a shroud and a hub are respectively disposed at the front side and rear side of the blades of the centrifugal impeller, the shroud and the hub are configured to restrict the movement of the fluid flowing within the blade flow channels. The hub is directly connected to the shaft and is used to transmit the shaft power to the blades. The shroud is used to restrict the flow of the fluid and is also able to increase the overall structural strength of the blades and to sustain the pressure difference between the inner side of the volute and the blade flow channels.

The typical centrifugal pump may be equipped with an open impeller, semi-open impeller or closed impeller. There is no shroud in the open impeller, the open impeller only has part of the hub for connecting the blades to the shaft, the impeller is installed between the front wall and the rear wall of the pump housing, and the flow field is controlled mainly by the gaps between the impeller and the front wall and the rear wall of the pump housing. The semi-open type impeller does not have the shroud but has a complete hub for connecting the blades to the shaft, and the flow field is controlled mainly by the gaps between the impeller and the front wall of the pump housing. The closed type impeller usually has both of the shroud and the hub, there is no gap between the impeller flow channels so that the efficiency is higher, and, in general, the shroud, the hub, and the blades are made of a single piece for providing a sufficient mechanical strength and effectively separating the liquid in each blade flow channel.

Herein, referring to FIG. 1A, FIG. 1B, and FIG. 1C, wherein FIG. 1A is a side cross-sectional view of a conventional plastic impeller having 2-dimensional blades, FIG. 1B is a top view of the plastic impeller in FIG. 1A, and FIG. 1C shows the gird-lines of the 2-dimensional blade in FIG. 1A. Note that, since the impeller is a rotary mechanical component, the cylindrical coordinate system is often used to describe the geometrical shape of the impeller, as shown in FIG. 1A, the along-axial cross-sectional surface of the impeller is on a r_z plane or meridional plane and is used to describe the geometrical shape of the flow channel changed from axial direction to radial direction after the flow of fluid entering into the impeller via suction, and is also used to describe the geometrical shape of the flow channel of the blades between the shroud 11 and the hub 12, and the r_θ plane in FIG. 1B is a projection plane perpendicular to the meridional plane. The shroud 11 has an inner surface 111. The surface element of the inner surface 111 on the r_z plane is a straight line parallel to r axis; in other words, the inner surface 111 is a 2-dimensional annular flat surface. The hub 12 has an inner surface 121. The surface element of the inner surface 121 on the r_z plane is a straight line not parallel to r axis, thus the inner surface 121 is a conical surface.

In FIG. 1A, the blades 13 are located between the shroud 11 and the hub 12, the distance from the shroud 11 to the hub 12 is called meridional width 131, and the meridional width 131 gradually decreases from the widest inlet width B11 of the blade 13 to the narrowest outlet width B12 of the blade 13. On the r_z plane (meridional plane), the blade 13 has a leading edge 132 at the inlet, the blade 13 has a shroud line 134 at a side thereof connected to the shroud 11, the blade 13 has a hub line 135 at a side thereof connected to the hub 12, the curved blade 13 has a trailing edge 136 at the outlet end, and there is a mean line 138 between the shroud line 134 and the hub line 135. In FIG. 1B, viewed on the r_θ plane, the shroud line 134 and the hub line 135 completely overlap with each other, two adjacent blades 13 have a sector width 137 therebetween, and the sector width 137 increases along a direction from the inlet of the blade 13 to the outlet of the blade 13 with the increasing of the radius. In the grid-lines in FIG. 1C, ordinate is the meridional coordinate $\overline{m}$, $[m=(r^2+Z^2)^{0.5}]$, meaning that the length of the shroud line 134, the mean line 138 and the hub line 135 on the r_z plane begin from m=0; abscissa is $\int rd\theta$ and which means that, from $\int rd\theta=0$, the circumferences of the shroud line 134, the mean line 138, and the hub line 135 projecting on the r_θ plane. FIG. 1B clearly shows that, in the 2-dimensional blade 13, the shroud line 134 and the hub line 135 completely overlap with each other, thus they are the same in blade angle β, tan β=dm/rdθ are the same, and angles are the same as viewed from the blade 13 on the r_θ plane.

In FIG. 1D, the manufacturing method of the conventional 2-dimensional plastic impeller forms the blades and the hub in a single piece, the molding of the blades and hub can be achieved simply by a fixed die and a moving die, and then the single piece of the blades and the hub is combined with a shroud using heat welding or melting rod so as to form a complete impeller.

To make the centrifugal impeller achieve high efficiency while considering that the axial flow of the fluid is switched to radial flow and circular flow after the fluid enters into the impeller via the pump suction, the shape of the blade in the suction section has to be a 2.5-dimensional or a 3-dimensional curve (also called twisted blade portion). The 2.5-dimensional blade has a higher efficiency than 2-dimensional blade since its blade angle is more in line with the requirements of the flow field, however, only the blade having the 3-dimensional surface would be able to be completely in line with the requirements of the flow field and fully achieve the goal of high efficiency. Herein, referring to FIG. 2A, FIG. 2B, and FIG. 2C, wherein FIG. 2A is a side cross-sectional view of a conventional plastic impeller having no shroud, FIG. 2B is a top view of the plastic impeller in FIG. 2A, and FIG. 2C shows the grid-lines of the 3-dimensional blade in FIG. 2A. In FIG. 2B, the surface element of the blade surface is a curved line, and such a surface is called a 3-dimensional surface, if the surface element of the blade surface is a straight line, and such surface is called a 2.5-dimensional surface. Comparing with the aforementioned 2-dimensional blade, the blade 23 in FIG. 2A is disposed on the hub 22, the meridional width 231 of the blade 23 gradually decreases from the widest inlet width B21 of the blade 23 to the narrowest outlet width B22 of the blade 23, the hub 22 has an inner surface 221, the surface element of the inner surface 221 on the r_z plane is a curved line, such that the inner surface 221 is a concave conical surface; in such a case, during the molding process of such an impeller, the molds for forming the flow channels have to be split into plural groups of mold slides or it cannot be removed from the flow channels after the impeller had been formed, such difficulty in removing mold slide particularly occurs at the inlet width B21 of the blade.

On the r_z plane (meridional plane), the blade 23 has a leading edge 232 at the inlet, the blade 23 has a shroud line 234 at a side thereof away from the hub 22, the blade 23 has a hub line 235 at a side thereof connected to the hub 22, the curved blade 23 has a trailing edge 236 at the outlet end, and there is a mean line 238 between the shroud line 234 and the hub line 235. In FIG. 2B, viewed on the r_θ plane, two adjacent blades 23 have a sector width 237 therebetween, but the shroud line 234 and the hub line 235 do not overlap with each other, particularly, at the portion of the blade 23 near the leading edge 232 having a 3-dimensional twisted blade portion 233, the twisted blade portion 233 is in a curved shape extending toward the suction, and the distance between the shroud line 234 and the hub line 235 decreases in a direction toward the blade outlet. In the grid-lines in FIG. 2C, β indicates the three-dimensional angle of the blade 23; at the inlet (i.e., where m is close to 100%), the shroud line 234 and the hub line 235 are different in β, thus the curved leading edge 232 connects two curved lines (i.e., the shroud line 234 and the hub line 235) to form a curved line element 239a, where the curved line element 239a is parallel to the leading edge 232; in a direction toward the blade outlet, the distance between the shroud line 234 and the hub line 235 decreases, and the curved line element 239a gradually turns into a straight line from a curved line. The current technology considers this configuration as a 3-dimensional blade surface 239.

Referring to FIG. 2D, each of the shroud line 234 and the hub line 235 of the 3-dimensional blade is formed by plural arc lines serially connected, these arc lines have different centers and different radius, thus the removal of the mold slide for forming the sector width 237 will interfere with the blade 23.

Referring to FIG. 3A, FIG. 3B, and FIG. 3C, wherein FIG. 3A is a side cross-sectional view of a conventional plastic impeller having a 2.5-dimensional blade surface but having no shroud, FIG. 3B is a top view of the plastic impeller in FIG. 3A, and FIG. 3C shows the grid-lines of the 3-dimensional blade in FIG. 3A. In FIG. 3A, the blade 33 is disposed on a hub 32, the meridional width 331 of the blade 33 gradually decreases from the widest inlet width B31 of the blade 33 to the narrowest outlet width B32 of the blade 33, the hub 32 has an inner surface 321, the surface element of the inner surface 321 on the r_z plane is a curved line, such that the inner surface 321 is a convex conical surface. On the r_z plane (meridional plane), the blade 33 has a leading edge 332 at the suction, the blade 33 has a shroud line 334 at a side thereof away from the hub 32, the blade 33 has a hub line 335 at a side thereof connected to the hub 32, the curved blade 33 has a trailing edge 336 at the outlet end, and there is a mean line 338 between the shroud line 334 and the hub line 335. In FIG. 3B, viewed on the r_θ plane, two adjacent blades 33 have a sector width 337 therebetween, but the shroud line 334 and the hub line 335 do not overlap with each other, particularly, at the portion of the blade 33 near the leading edge 332 having a 2.5-dimensional twisted blade portion 333, where the twisted blade portion 333 is a straight shape axially extending toward the suction. At the inlet of the blade 33, the straight line of the leading edge 332 connects the shroud line 334 and the hub line 335 to form a blade surface 339, where the blade surface 339 is formed by a straight line element 339b. The current technology considers this configuration as a 2.5-dimensional blade surface.

In the prior art in manufacturing a 2.5-dimensional impeller, the shroud and the blades are formed in a single piece, the mold slides in the sector flow channels are demoulded along the straight-line element of the blade surface and would not result in interference, and then the shroud and the blades are assembled to the hub by heat welding or melting rod so as to form a complete impeller. However, the shroud line 334 and the hub line 335 of the 2.5-dimensional blade are formed by plural curved lines connected to each other, such that radially removing the mold slide from the sector width 337 still will interfere with the blades, further, the blade surface of the 3-dimensional twisted blade portion is formed by curved line element, thus removing the mold slide at the sector width 337 along the curved line element of the blade surface will still interfere with the blades. Therefore, the same molding process is not available to be used herein, in addition, the hub is a power transmission component, although the hub can be assembled to the blades by heat welding or melting rod, there still exists seams or structural discontinuity between the hub and the blades because the hub is not produced by the same molding process of forming the blades, resulting in a weaker structural strength and thus unable to operate under conditions, such as high temperature (e.g., 200° C.) and high load.

As discussed above, a high-efficiency plastic impeller must have a shroud, hub, and 3-dimensional twisted blade portion and must overcome the difficulties of molding.

In addition, conventionally, a 3-dimensional metal impeller having shroud and hub may be produced by using lost-mold casting or by using sheet metal to make various parts and then welding them together. However, these methods are already mature technologies. The manufacturing of a 3-dimensional closed impeller of a conventional plastic pump has the following existing technologies:

1. Using a five-axis machining machine, a single piece of plastic body is carved into an impeller with a 3-dimensional blade surface. This method can result in a lot of material waste and high processing costs. The narrow flow channel width or highly twisted shape of the blade is not appropriate to adopt such a processing method;

2. Using a five-axis machining machine, a whole piece of plastic body is carved into an impeller with a 2.5-dimensional blade surface. Although this processing method can easily use flank milling compared to the former method, such a processing method will still cause a lot of material waste and high processing cost, and although the straight-line element of the blade line reduces the twist of the blade, it also reduces the efficiency of the pump, so this method cannot fully meet the flow field requirements;

3. Forming the impeller's shroud, multiple blades and hub separately by using respective molds and then assembled them together by ultrasonic welding or heat welding. However, the blades, the shroud, and the hub in this processing method are not formed in a single process by the same forming process, thus resulting in seams or structural discontinuities therebetween and thereby weak structural strength which can be damaged at high working temperature (such as about 200° C.) or high load applications;

4. The entire set of impeller twisted blade portions are divided into two groups. On the shroud and the hub, part of the blades is produced in one piece. Most of the blades are evenly split, and then these components are assembled to become an impeller using ultrasonic welding or heat welding. This method increases the space of the sector width between the blades, but the axial or radial demolding cannot be directly performed at the leading edge of the twisted blade portion demolding, so a mold slide demolding mechanism is still required. And this method still has half of the blades to be assembled by ultrasonic welding or heat welding, thus the problems that the structural strength is weak and easily damaged at high working temperature (such as about 200° C.) or high load applications are still existing;

5. Replacing the 3-dimensional twisted blade portion with a 2-dimensional blade geometry and replacing the curved lines of the flow field with a simple arc line, thereby allowing the mold slides to be removed smoothly, however, the pump performance of the 2-dimensional blade is low, thus the efficiency is decreased and unable to meet the pump energy efficiency requirements of the EU;

6. Some use the evaporative casting method to form the impeller, but the evaporative casting cannot be reused, and it requires additional chemical agents or heating to decompose the evaporative casting core, which leads to complex manufacturing processes and increases costs, resulting in inconsistency with economic production requirements;

7. Some others try to layer the mold slide in the flow channels so that a group of mold slides is used to form each flow channel, thus, the mold slides can be sequentially taken out from the flow channel. During the removal of the mold slides, the space that was occupied by the previously removed mold slide becomes available for the removal of the rest of the mold slides, thus the removal of the rest of the mold slides can be performed without interference. However, this method is only applicable to the pump model having large flow channel width, large flow rate, and low head (medium to high specific speed). Only these types of pump would have sufficient space to layer the mold slides. In addition, the demolding process of this method is complicated, and the design of the demolding mechanism is complex, which increases the production cost.

Some existing public references related to impeller manufacturing are provided below:

Reference 2 (China patent CN 103128974 A)

Reference 2 relates to a production process for a plastic closed type impeller. Reference 2 pointed out that in order to facilitate the demolding process, the pump impeller adopts blades having a single arc, but it will reduce the impeller's efficiency. The closed type impeller uses blades having double arcs to improve efficiency. However, the slides of the impeller mold could not be removed, such that the impeller of a single piece could not be produced. Reference 2 proposed that the shroud and the hub were produced in two sets of molds, and then combined together via plastic screws, but Reference 2 did not mention how the 3-dimensional twisted blade portion is made, and the drawings of Reference 2 also shows that the blade mold is axially unidirectional removed, so it is only suitable for 2-dimensional blades. And Reference 2 does not describe the reliability in using plastic screws to assemble the blades instead of integrally formed, and whether it can be applied to high temperature, high load occasions.

Reference 3 (China patent CN 104131995 A)

Reference 3 relates to a water pump impeller's manufacturing method and the water pump. Reference 3 proposed using a moving die and a fixed die to make an impeller using injection molding or die casting or extrusion, but Reference 3 indicates that since the mold slide is not used, the hub of the impeller will form a notch to affect the efficiency. If an insert is used to fill the notch on the hub, the efficiency can be raised, but the impeller power transmission in Reference 3 is applied to the spindle bore and hub through the shaft, due to the existence of the hole in the hub, only a small area around the notch remains. The connection between the hub and blades must have the mechanical structural strength for pump power transmission. The drawings of Reference 3 shows that the connection of the hub and blade is an area at small radius near the spindle bore, which needs to bear larger toque load, and the hub area needs to be limited to the range of the impeller suction to perform the demolding process, so that Reference 3 will only be applicable to a centrifugal pump with high flow rate and lower head (medium to high specific speed).

Reference 4 (China patent CN 105179304 A)

Reference 4 has a plastic anti-corrosion and wear-resistant pump and its impeller molding die, Reference 4 indicates that the plastic centrifugal pump efficiency is generally lower than that of the metal pump, and which is mainly because the efficiency of the centrifugal pump impeller requires the axial and radial directions of the impeller flow channel must be a twisted in accordance with the hydraulic model. In the existing pressing mold technology, the mold is difficult to be removed from the highly twisted flow channel, and the metal impeller formed by the casting process, the molds can be removed by spalling them. Reference 4 proposes an impeller mold that can produce a plastic 3-dimensional twisted blade portion, but the impeller flow channel mold slide proposed by Reference 4 is divided into three groups, which must be taken out sequentially, which causes a complicated demolding process and increases production cost, and makes it difficult to design an automatic demolding mechanism, failing to meet the economic production requirements.

Reference 5 (China patent CN 107471547 A)

Reference 5 relates to a mold for manufacturing centrifugal impeller and provides a molding mechanism for an impeller of a centrifugal fan. The mold slide in the impeller flow channel is divided into two groups. The linkage mechanism is designed to produce an impeller having width variation on the r_z plane. But the blade length of the general centrifugal fan is shorter than that of the pump blade, the drawings of Reference 5 also shows that its embodiment is a 2-dimensional blade, Reference 5 also mentions that the path of the placing and removal of the mold slides for the impeller flow channel is along a straight line, showing that the blade design for the mold mechanism is not suitable for the 3-dimensional twisted blade portion required by the centrifugal pump.

Reference 6 (China patent CN 107092763 A)

Reference 6 relates to a 3-dimensional design of a turbomachinery impeller with castability. Reference 6 illustrates that one of the important ways in improving the efficiency of various turbomachine is the 3-dimensional design of the impeller, but a flow channel geometry suitable for production is necessary. Reference 6 proposes a design method that considers the feasibility of manufacturing for a metal casted 3-dimensional impeller, but Reference 6 does not propose a manufacturing scheme for plastic pump impeller suitable for being made by injection molding or transfer molding.

Reference 7 (China patent CN 202209308 U)

Reference 7 relates to an efficient fully-three-dimensional impeller, Reference 7 proposes a 3-dimensional impeller design configured to raise the efficiency, but Reference 7 mentions that the new impeller design uses aluminum alloy, the drawings of Reference 7 show that the impeller is a semi-open impeller applied to the fan, but Reference 7 does not provide descriptions for the manufacturing method.

Reference 8 (China patent CN 203009383 U)

Reference 8 relates to a small flow closed full-milling three-dimensional impeller, which belongs to the technical field of centrifugal compressors. Reference 8 proposes adding a ring-shaped groove to the impeller shroud, which cooperates with impeller suction and outlet and is manufactured by mechanical processing instead of using welding or riveting to assemble the impeller. But the use of machining to engrave the blade flow channel has the problem of high manufacturing cost. Reference 8 does not mention anything related to cost-effectiveness, and the ring-shaped groove on the shroud will create interference with the flow in the flow channel, decreasing the impeller efficiency.

Reference 9 (China patent CN 206753985 U)

Reference 9 relates to a closed impeller, Reference 9 provides a method for combining the shroud and the impeller, the dovetail slot and the positioning block mechanism design can increase the restriction in axial direction, preventing loosening during operation. But Reference 9 does not provide the material and the manufacturing method of the 3-dimensional blade flow channel.

Reference 10 (WO2007/046565 A1)

Reference 10 provides an injection molding strategy for the pump impeller for the car cooling cycle. Reference 10 mentions integrally forming an impeller using injection molding can improve the blade efficiency and improve the impeller reliability, but the drawings of Reference 10 show that the blade is a 2-dimensional blade, and the contents of Reference 10 does not provide any description of the production method for 3-dimensional blade flow channel of plastic impeller.

Reference 11 (China patent CN 102264525 A)

Reference 11 relates to a spray-casting process for pump impeller and a pump impeller. Reference 11 indicates that the impeller's flow channel will have a side concave, that is, there is a bent side near the impeller suction side and connected to the pump suction, and the side concave will obstruct the removal of mold core along the flow channel radially. The prior art must use an evaporative casting core, or an assembly of multiple parts to form an impeller. To reduce the cost, Reference 11 provides a method for taking out the mold slide from the flow channel of the centrifugal pump impeller. The mold slide is reusable so it can replace the evaporative casting core. A part of the mold cores is removed in the radial direction for making room in the flow channel of the impeller, and then the mold core having the side concave is removed. Reference 11 even provides an optimized embodiment that designs a set of linkage mechanism allowing several mold cores to be removed together. However, if there is no automatic demolding mechanism, the manually demolding will lead to a complicated demolding process, increasing the production cost and failing to meet the requirement of economic production. If the linkage mechanism proposed by Reference 11 is employed, the flow channel must have sufficient space, especially the axial width must be sufficient to design the guiding path. The impeller flow channel and the outlet axial width of the centrifugal pump will vary according to the pump type. Usually, the model with small flow rate and high head (low specific speed) has a smaller outlet, even only has a few millimeters, thus the mold core is unable to be divided into groups, and the guiding mechanism is not able to be employed. Regarding the models with large flow rate, low head (medium to high specific speed), the blade having a certain degree of twisting is able to achieve higher efficiency. The mold cores must be axially segmented and segmented on the meridional plane, the number of the mold cores will increase, and the difficulty of designing the demolding mechanism will increase as well.

Reference 12 (WO2014/139578 A1)

Reference 12 relates to a pump specifically designed to transport liquids containing foreign particles, such as sand-containing water, which can cause impeller wear, so wear-resistant impeller materials are required, and Reference 12 uses softer materials such as rubber, as the impeller's wetted material to resist wear, and the rubber type material is elastic and easy to deform, so that the mold slide can be taken out from the impeller flow channel easily. But Reference 12 defines the impeller material as a rubber material with high elastic modulus, at the same time, it also limits the application range of the pump, especially the high temperature (e.g., 200° C.) and high load operating conditions. The plastic pump's wetted material is usually made of fluoroplastic, and the impeller of a sealless pump must resist axial thrust load and so must have contact with or a very small clearance with the shroud suction side to reduce internal leakage loss. The working temperature of the rubber impeller depends on the material, it generally cannot reach 200° C., and because of the high modulus of elasticity, the deformation will occur during power transmission and thus failing to meet the sealless pump application requirements.

Reference 13 (Taiwan patent TW 201640027 A)

Reference 13 relates to a manufacturing method of a centrifugal impeller for a fluid-operated pump, Reference 13 divides the impeller into two groups, the shroud and one-half of the blades, and the hub and the other half of the blades, and uses positioning holes and ultrasonic welding to combine the hub, shroud and blades. This method only increases the production space between the blades, but Reference 13 does not explain how the blade twisting segment of the impeller at the central suction port separates from the mold from the finished blade, and the impeller in reference 13 still has half the amount of blades not integrally formed with the hub responsible for power transmission, but only connected to the hub by ultrasonic welding or chemical glue, screws. That is, the impeller of Reference 13 in its embodiment has half of impeller loading transmitted merely through the blades having very small contact surfaces with the shroud. The problems that, the plastic material has a reliability issue in mechanical strength at some applications, such as high temperature (e.g., 200° C.) and high load, are not explained in Reference 13.

Reference 14 (United States Patent US 2018/0243955A1)

Reference 14 relates to an impeller manufacturing method using injection molding method, but, in the mold, the impeller's twisted blade portion is located on a peripheral surface of the hub only has a small portion connected to the hub and does not overlap with the hub, so no mold slide is required. After the injection, the blade is folded and locked to the hub so as to form an impeller. Although Reference 14 allows the blade shape to be produced without restriction to achieve a better impeller efficiency, the way that the blades are connected to the hub makes the impeller unable to withstand high toque load, so it is only suitable for low-power devices. Reference 14 also states that its technical field is for low-power application such as automotive cooling fan.

Reference 15 (U.S. Ser. No. 10/016,808 B2)

Reference 15 relates to an evaporative casting core structure configured to produce a metal or plastic 3-dimensional twisted impeller. After impeller injecting or injection molding, the evaporative casting core will be decomposed by chemical agents or heating. This manufacturing process is complicated and high in cost, which does not meet the needs of economic production.

Reference 16 (European Union patent EP 0734834A1)

Reference 16 relates to a mold structure for a closed type plastic impeller, and is configured to produce an integrated impeller, using a combination of upper and lower radially extracted mold slide cores and mold mechanism, and using the injection molding method to produce the impeller. But reference 16 does not use any axially removable mold and thus it is unable to produce a 3-dimensional twisted blade portion. The drawings of Reference 16 also show that the impeller is a 2-dimensional structure, so it is difficult to achieve high-efficiency requirements.

SUMMARY

The disclosure provides a manufacturing method of a die-formed 3-dimensional plastic impeller of a centrifugal pump, wherein the hub of the impeller includes a hub rim part and an inner hub, the hub rim part has a hub hole, a shroud of the impeller includes a shroud rim part and an inner shroud, the shroud rim part has a shroud hole, a front portion of each blade is a twisted blade portion and located between the hub hole of the hub rim part and the shroud hole of the shroud rim part. The shroud rim part has an inner surface, on the r_z plane, the surface element of the shroud rim part may be a curved line; the hub rim part has an inner surface, on the r_z plane, the surface element of the hub rim part may be a curved line. The manufacturing method is achieved by using a mold for the twisted blade and a mold for the impeller outlet. The mold for the twisted blade is disposed through the hub hole and the shroud hole and used a fixed die and a moving die for forming the twisted blade portions of the blades, the twisted blade portions are arranged in a circle at a central portion of the shroud and the hub and are formed above the hub hole and the shroud hole. The difficulty of demolding at the formed twisted blade portions is significantly reduced; meanwhile, the mold for impeller outlet is used to integrally form the rest portion of the blades other than the twisted blade portions as well as the hub rim part used to bear power transmission. The shroud hole of the shroud rim part and the hub hole of the hub rim part can be covered by other components (e.g., the inner shroud and the inner hub), and these components can be formed by simple molds and then assembled to the hub rim part and the shroud rim part to form a complete impeller by heat welding or melting rods, wherein the torque can be directly transmitted to the blades via the hub rim part.

The disclosure provides a die-formed 3-dimensional plastic impeller of a centrifugal pump, each blade includes a front portion and a rear portion connected to each other, the front portion includes a first shroud line and a first hub line, the rear portion includes a second shroud line and a second hub line, each front portion of the blade is the aforementioned twisted blade portion, the hub includes a hub rim part and an inner hub, the hub rim part has a hub hole; the shroud includes a shroud rim part and an inner shroud, the shroud rim part has a shroud hole; the front portion of each blade is located between the hub hole of the hub rim part and the shroud hole of the shroud rim part; the rear portion of each blade, the hub rim part, and the shroud rim part are formed in a single piece at the same molding process. The hub rim part is configured to transmit torque to the blades. The inner shroud is installed at the shroud hole, the inner hub is installed at the hub hole so that they are connected to the front portion of each blade and form a complete impeller with the blades, the hub rim part, and the shroud rim part.

The main purpose of the plastic centrifugal impeller structural of the disclosure is to achieve mass production using molds so as to reduce the manufacturing cost and to achieve a highly efficient performance of the centrifugal blade with a 3-dimensional surface geometry, and to be applicable to high temperatures (e.g., 200° C.) and high load operating conditions.

While forming the centrifugal impeller of the disclosure, the hub rim part of the hub is integrally formed with the impeller rear portion of each blade, such that the torque can be reliably transmitted to all of the blades via the hub rim part of the hub.

The second shroud line and the second hub line of the blade are different in the blade angle so that they do not overlap with each other on the grid-lines of the blade. In such a case, the demolding at such a portion can be achieved by radially remove two mold slides sequentially. In the case that the shroud rim part and the hub rim part are parallel to each other on r-z plane, the demolding for the same can be achieved by radially removing a single and simple mold slide of the mold for impeller outlet.

In the case that the second shroud line and the second hub line of the blade overlap with each other, the blade at the impeller outlet can be directly formed without using mold slides and then assembled to the shroud and the inner hub to form a complete 3-dimensional plastic impeller by heat welding or melting rods. Because the shroud will bear the pressure difference of the fluid and provide overall strength of the impeller after molding, the shroud shall not have the problem of loosening due to high temperature and high load.

Generally, the molds for forming the impeller can be divided into two assemblies, the first assembly is the mold for twisted blade configured for forming the 3-dimensional twisted blade portions at the impeller suction, where the mold for twisted blade may have a fixed die and a moving die, the fixed die and the moving die can be axially removed through the shroud hole of the shroud rim part and the hub hole of the hub rim part in opposite directions; the second assembly is the mold for impeller outlet configured for forming the outer flow channels of the impeller, where it has the same number of mold slides or mold slide groups as the flow channels, these mold slides or mold slide groups can be radially removed along the curved line of the flow channel. The annular shroud rim part and hub rim part and each blade are formed in a single piece at the same molding process; in some other cases, only the blades and the hub rim part may be formed in a single piece at the same molding process.

The manufacturing method of a 3-dimensional plastic impeller of a centrifugal pump and the impeller manufactured thereby disclosed by the disclosure should at least be able to achieve the following effects: 1. Each part can be produced using mold and can be automatically demolded, having production value; 2. The twisted blade portions can be formed by using a set of fixed die and moving die, and the 3-dimensional twisted blade geometry helps improve pump performance; 3. The blades and the hub rim part are formed in a single piece at the same molding process and thus having a higher structural strength, the hub directly transmits torque to the blades, which helps the impeller to operate at high working temperature (e.g., approximately 200° C.) or high load without being damaged.

The above descriptions of the disclosure and the following descriptions of the embodiments are provided to demonstrate and explain the spirit and principles of the disclosure and to provide further explanation of the claims of the disclosure.

The present disclosure will become better understood from the detailed description given hereinbelow and the accompanying drawings which are given by way of illustration only and thus are not intending to limit the present disclosure and wherein:

BRIEF DESCRIPTION OF THE DRAWINGS

FIG. 4A is a side cross-sectional view of a plastic impeller according to a first embodiment of the disclosure.

FIG. 4B is a top view of the plastic impeller in FIG. 4A.

FIG. 10A is a side cross-sectional view of a plastic impeller according to a third embodiment of the disclosure.

FIG. 10B is a top view of the plastic impeller in FIG. 10A.

DETAILED DESCRIPTION

Figures 1A, 1B:
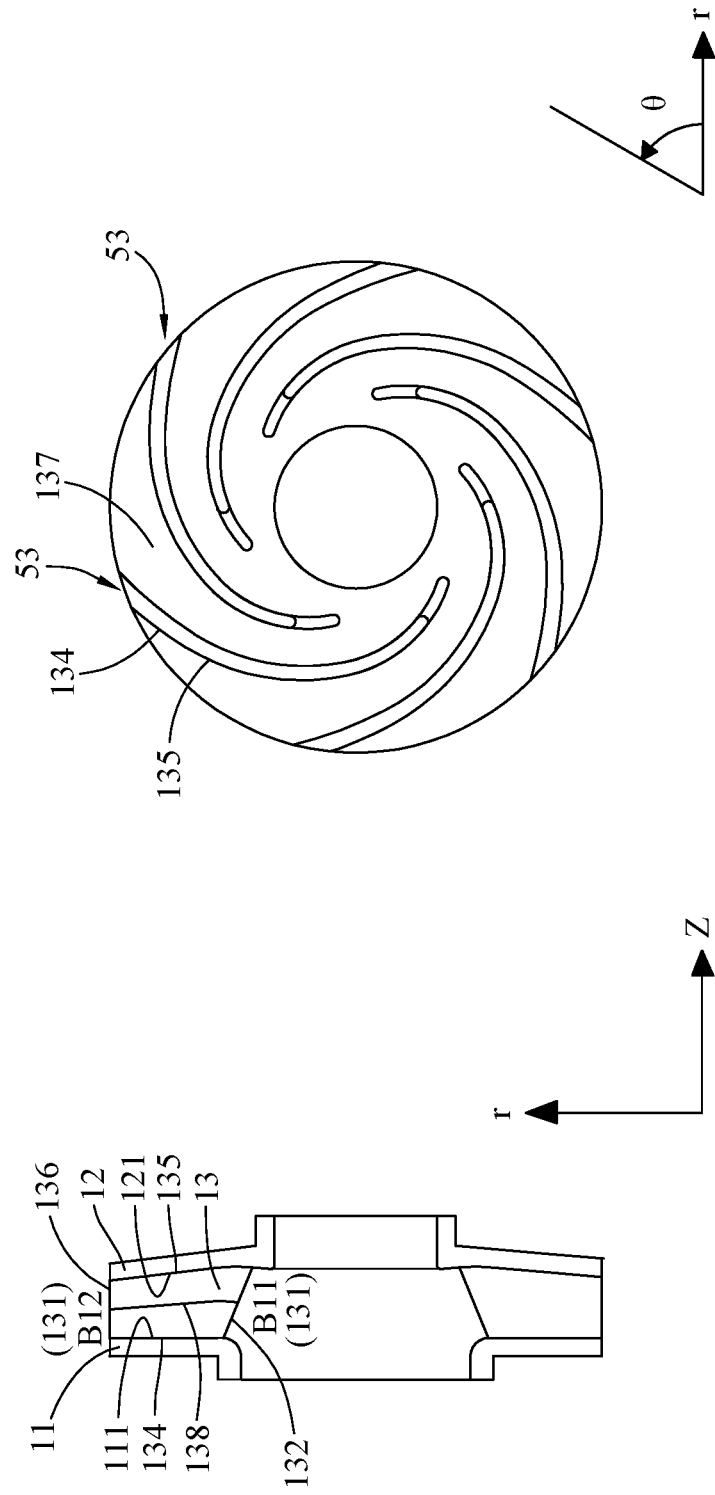
FIG. 1A is a side cross-sectional view of a conventional plastic impeller having 2-dimensional blades.
FIG. 1B is a top view of the plastic impeller in FIG. 1A.
Figure 1C:
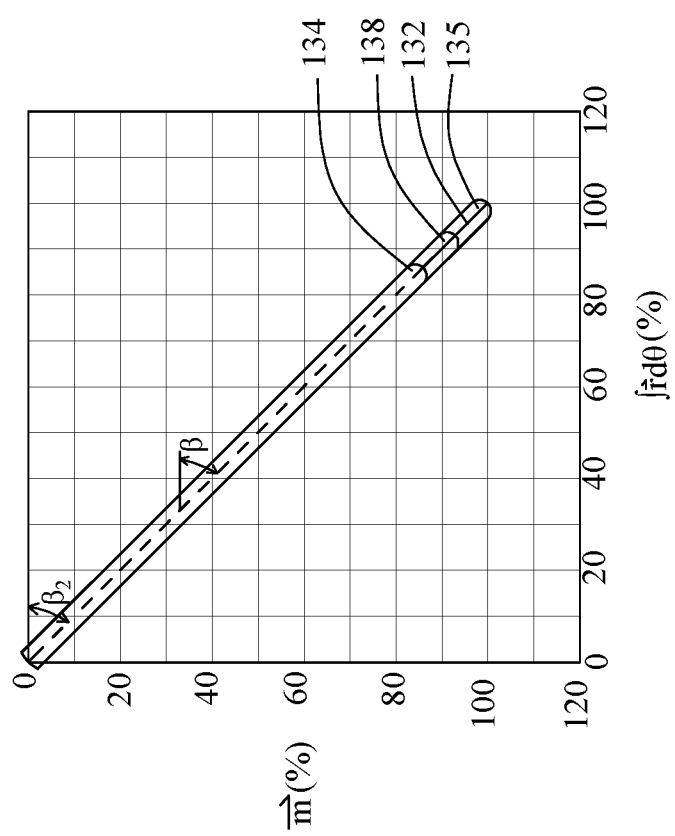
FIG. 1C shows the grid-lines of the 2-dimensional blade in FIG. 1A.
Figure 1D:
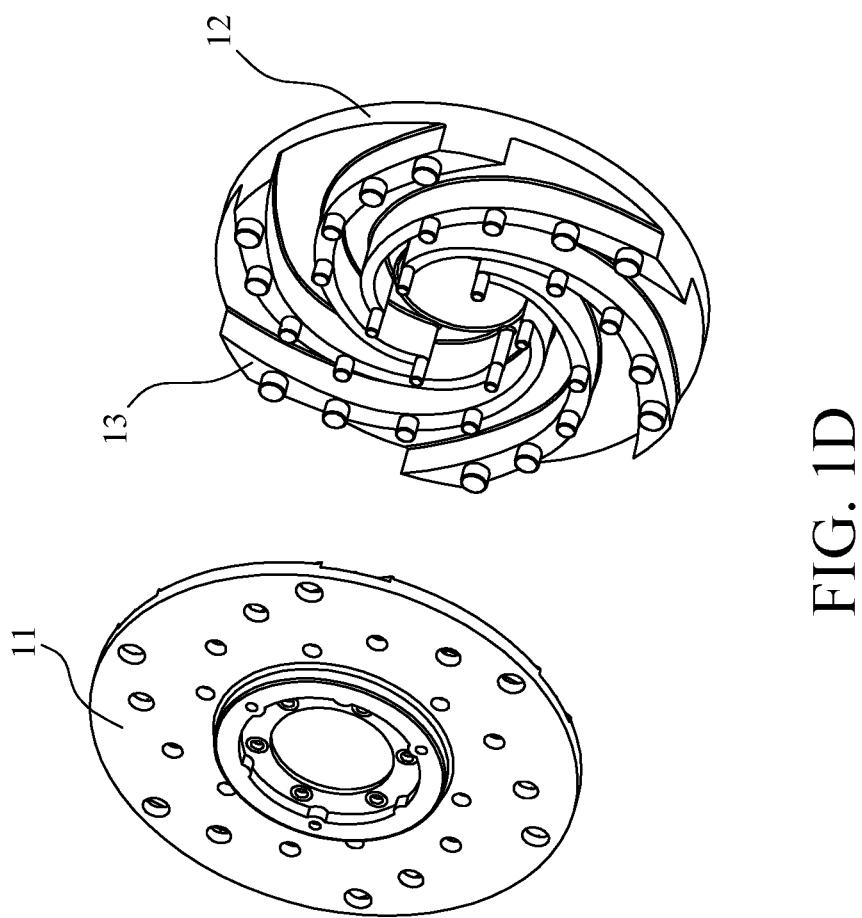
FIG. 1D is a perspective exploded view of the 2-dimensional blade in FIG. 1A.
Figures 2A, 2B:
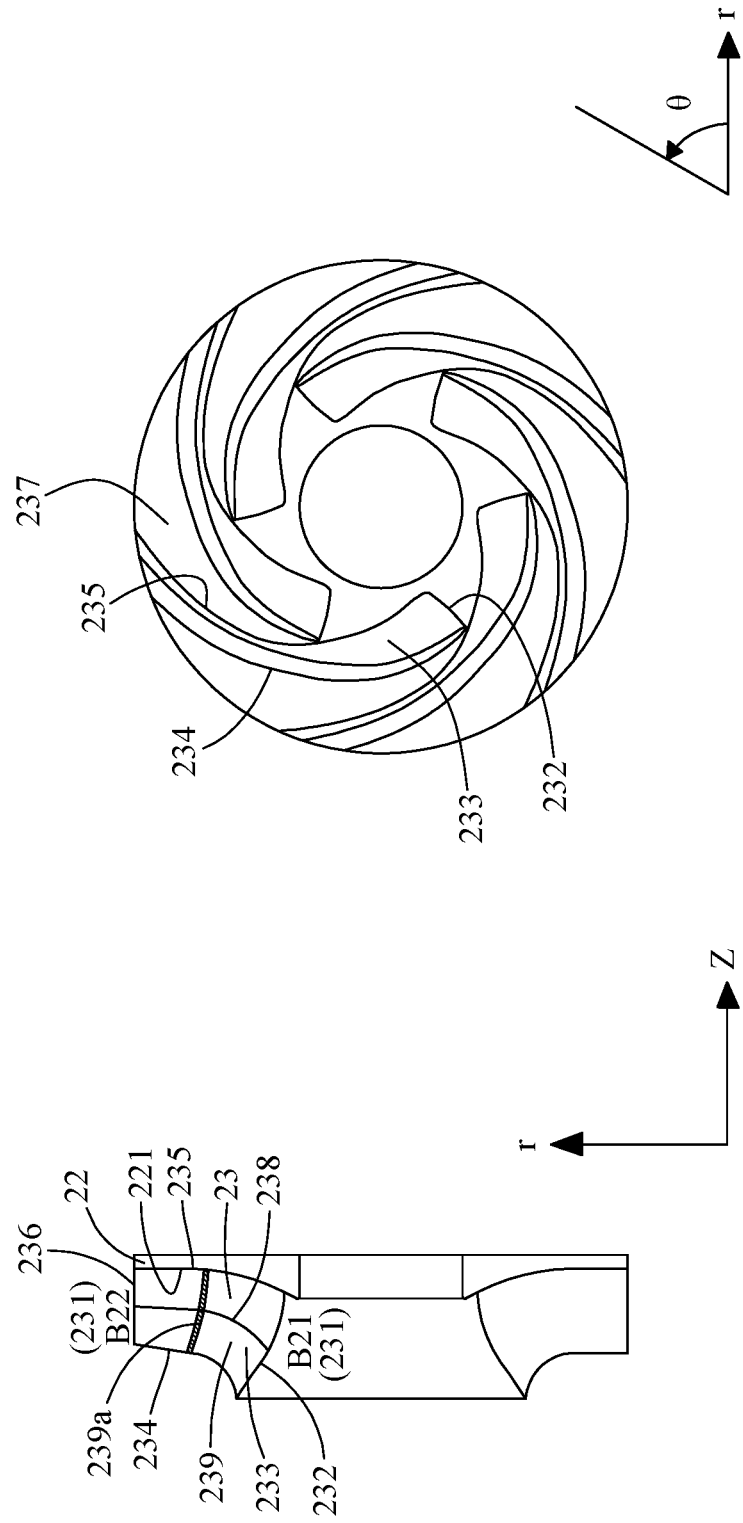
FIG. 2A is a side cross-sectional view of a conventional plastic impeller having 3-dimensional blades but having no shroud.
FIG. 2B is a top view of the plastic impeller in FIG. 2A.
Figure 2D:
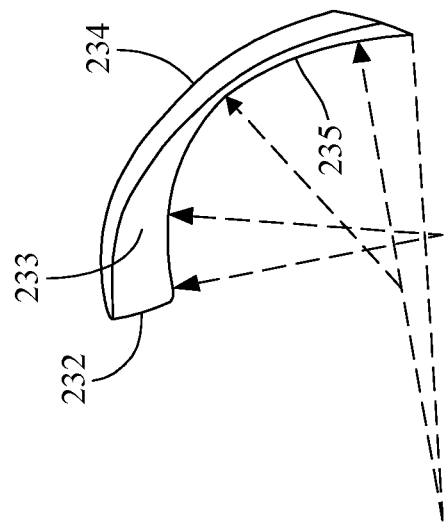
FIG. 2D is a schematic view of the 3-dimensional blade in FIG. 2A showing a plurality of curved sections thereof.
Figure 2C:
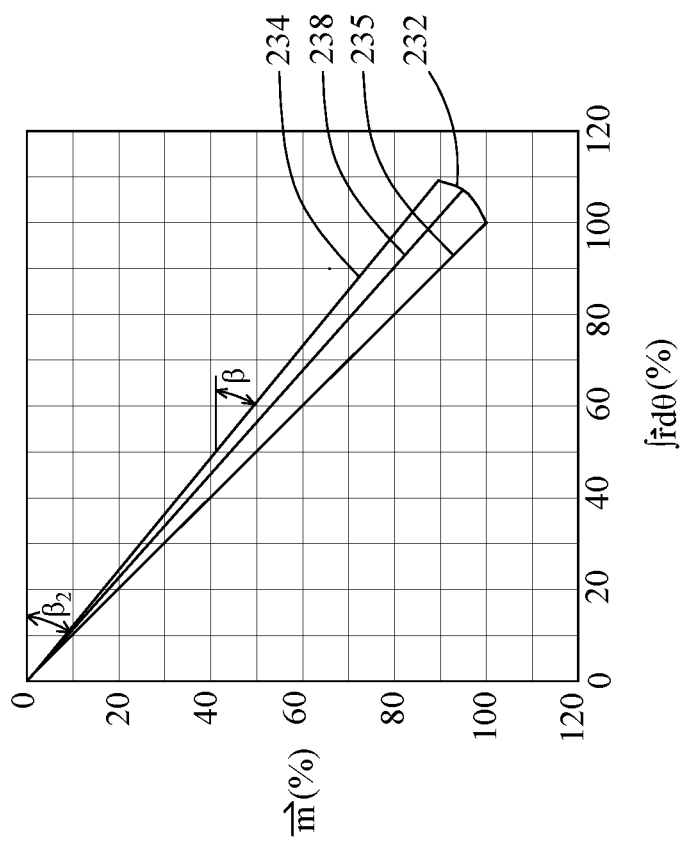
FIG. 2C shows the grid-lines of the 3-dimensional blade in FIG. 2A.
Figures 3A, 3B:
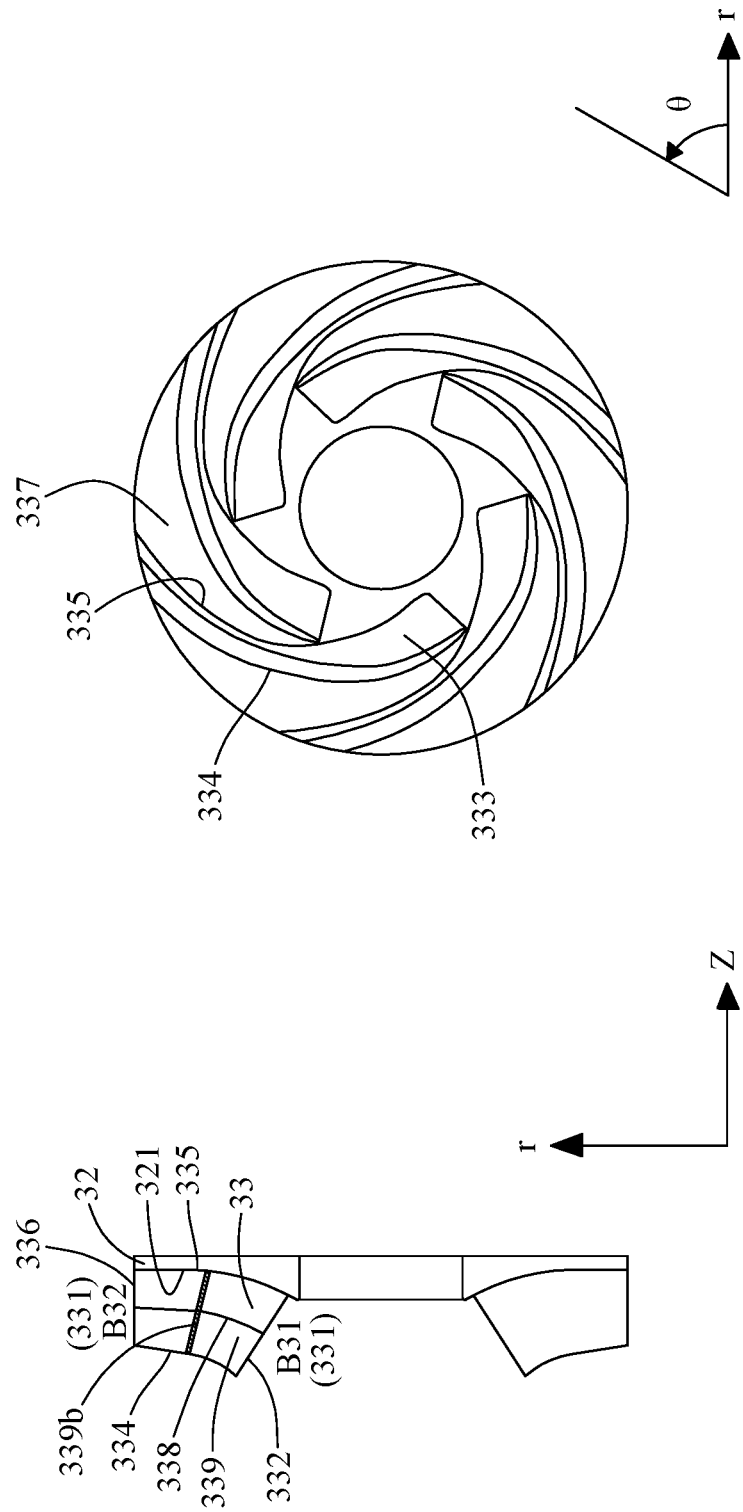
FIG. 3A is a side cross-sectional view of a conventional plastic impeller having a 2.5-dimensional blade surface but having no shroud.
FIG. 3B is a top view of the plastic impeller in FIG. 3A.
Figure 3C:
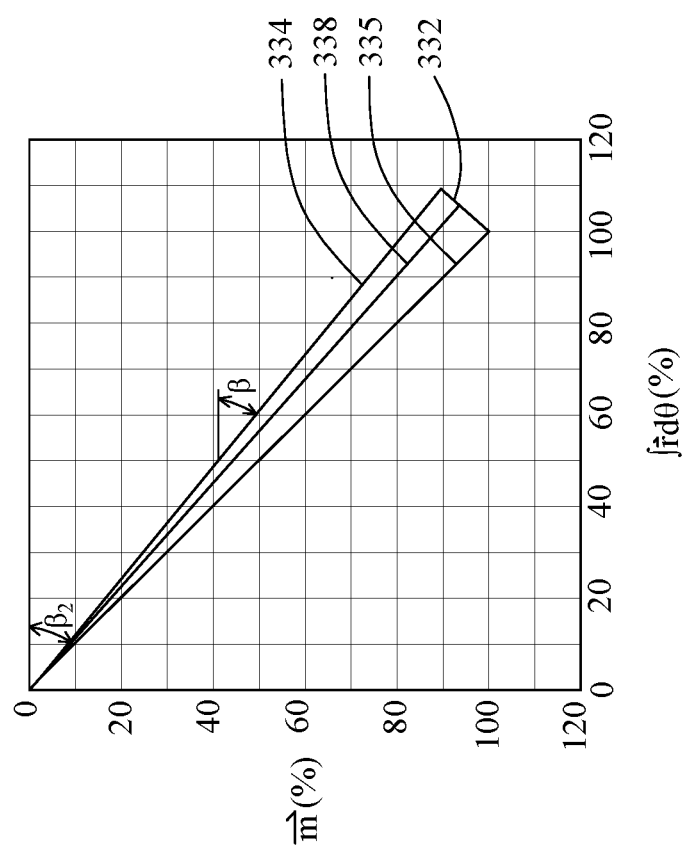
FIG. 3C shows the grid-lines of the 3-dimensional blade in FIG. 3A.

The detailed features and advantages of the disclosure are set forth in the detailed description below, which are for those skilled in the art to understand the technical contents of the disclosure, and in accordance with the disclosure, the scope of the claims, and the accompanying drawings, any person skilled in the art can easily understand the purpose and advantages of the disclosure. The following embodiments further elaborate on the disclosure but do not limit the scope of the disclosure by any point of view.

In addition, the disclosure of the disclosure will be disclosed in the following figures. For clarity, many practical details will be explained in the following descriptions. However, it should be understood that these practical details are not used to limit the disclosure.

Moreover, some existing conventional structures and components may be shown in a simple schematic manner for the purpose of simple illustration. In addition, some of the features in the drawings of the disclosure may be slightly enlarged or changed in proportion or size for the purpose of understanding and viewing the technical features of the disclosure, but this is not intended to limit the disclosure. The actual size and specifications of the products manufactured in accordance with the disclosure of the disclosure may be adjusted according to the requirements, the characteristics of the product itself, and the contents of the disclosure as disclosed below.

First Embodiment

Figure 4C:
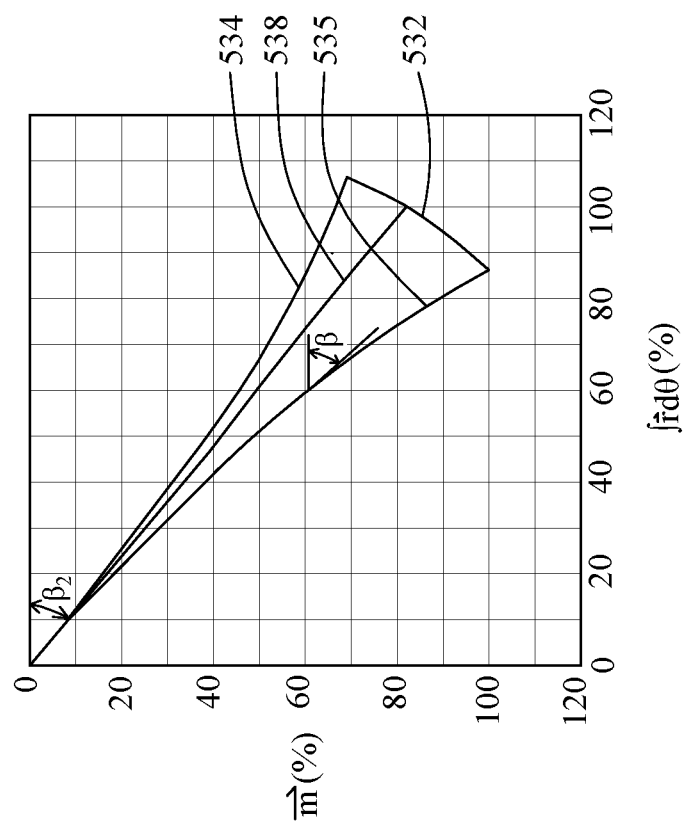
FIG. 4C shows a grid-lines of the blade in FIG. 4A.
Figure 5:
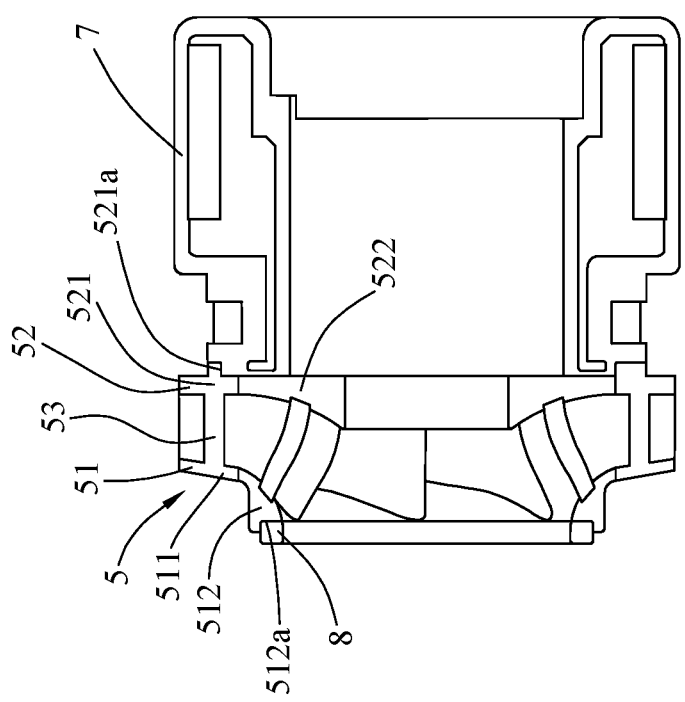
FIG. 5 is an assembly cross-sectional view of the plastic impeller of the first embodiment of the disclosure.

Firstly, referring to FIGS. 4A-4C, and FIG. 5, FIG. 4A is a side cross-sectional view of an impeller 5 according to the first embodiment of the disclosure, FIG. 4B is a top view of the impeller 5 in FIG. 4A, FIG. 4C shows a grid-lines of the blade 53 in FIG. 4A, and FIG. 5 is an assembly cross-sectional view of the impeller 5 of the first embodiment of the disclosure. This embodiment provides a plastic impeller 5 for a centrifugal pump having 3-dimensional flow channels.

In this embodiment, the impeller 5 includes a plurality of blades 53, a hub rim part 521, an inner hub (rear inner plate) 522, a shroud rim part 511, and an inner shroud (front inner plate) 512. As shown in FIG. 5, the shroud rim part 511 and the inner shroud 512 together from a shroud 51, and the hub rim part 521 and the inner hub 522 together from a hub 52, In addition, as shown in FIG. 4A or FIG. 4F, the shroud rim part 511 has an inner surface 5111, the surface element of the inner surface 5111 on the r_z plane is a curved line; the hub rim part 521 has an inner surface 5211, the surface element of the inner surface 5211 on the r_z plane is a straight line parallel to the r-axis so as to form a flat surface; in other words, the inner surface 5211 is a 2-dimensional annular flat surface.

Further, as shown in FIG. 4A or FIG. 4B, the hub rim part 521 has a hub hole 5210, the shroud rim part 511 has a shroud hole 5110, each blade 53 is at least partially located between the shroud hole 5110 of the shroud rim part 511 and the hub hole 5210 of the hub rim part 521.

In detail, regarding the blade 53, on the r_z plane (meridional plane), the blade 53 has a leading edge 532 near the suction 54, the blade 53 has a shroud line 534 at a side thereof connected to the shroud rim part 511, the blade 53 has a hub line 535 at a side thereof connected to the hub rim part 521, the blade 53 has a trailing edge 536 at a side thereof located furthest away from the suction 54, and there is a mean line 538 between the shroud line 534 and the hub line 535. In more detail, in this embodiment, the blade 53 includes a front portion 530a and a rear portion 530b connected to each other, the front portion 530a is the portion of the blade 53 located relatively closer to the leading edge 532, and the rear portion 530b is the portion of the blade 53 located relatively closer to the trailing edge 536; that is, the front portion 530a is the portion of the blade 53 located relatively closer to the suction 54, and the rear portion 530b is the portion of the blade 53 located relatively away from the suction 54. Also, in this embodiment or some other embodiments, the shape of the front portion 530a is much more twisted than the rear portion 530b, thus, the front portion 530a is the 3-dimensional twisted portion of the blade 53 and can also be called twisted blade portion. In addition, the front portion 530a of the blade 53 is located between the shroud hole 5110 of the shroud rim part 511 and the hub hole 5210 of the hub rim part 521, in other words, the twisted blade portion of the blade 53 is located between the shroud hole 5110 of the shroud rim part 511 and the hub hole 5210 of the hub rim part 521. In addition, the front portion 530a is connected to the hub rim part 521 and the shroud rim part 511 via the rear portion 530b.

In addition, the meridional width 531 of the blade 53 gradually decreases from the widest suction width B51 of the blade 53 to the narrowest outlet width B52 of the blade 53. In addition, in FIG. 4B, viewing from the angle on the r_θ plane, two adjacent blades 53 have a sector width 537 therebetween, the leading edge 532, the shroud line 534, and the hub line 535 do not overlap with one another. Particularly, in FIGS. 4A and 4B, regarding the front portion 530a and the rear portion 530b of the blade 53, the shroud line 534 of the blade 53 includes a first shroud line 5341 and a second shroud line 5342, the hub line 535 of the blade 53 includes a first hub line 5351 and a second hub line 5352; in other words, the first shroud line 5341 and the first hub line 5351 respectively are the portions of the shroud line 534 and the hub line 535 on the front portion 530a, and the second shroud line 5342 and the second hub line 5352 respectively are the portions of the shroud line 534 and the hub line 535 on the rear portion 530b. In this embodiment, on the shroud line 534, only the second shroud line 5342 is directly connected to the shroud rim part 511; on the hub line 535, only the second hub line 5352 is directly connected to the hub rim part 521.

In this embodiment and other embodiments, the blade 53 is in a twisted shape, thus the second shroud line 5342 and the second hub line 5352 of the rear portion 530b of the blade 53 do not overlap with each other on the grid-lines of blade 53 (e.g., shown in FIG. 4C), and the first shroud line 5341 and the first hub line 5351 of the front portion 530a of the blade 53 are different in blade angle, thus the first shroud line 5341 and the first hub line 5351 do not overlap with each other on the grid-lines of the blade 53 (e.g., shown in FIG. 4C). The non-overlapping between the first shroud line 5341 and the first hub line 5351 on the front portion 530a can be seen more obvious on the impeller 5 viewing from the grid-lines, thus the front portion 530a of the blade 53 has a more drastic geometry change compared to the rear portion 530b.

Specifically, it would be clearer viewing from the grid-lines of the blade 53 in FIG. 4C, the outlet blade angles $\beta_2$ are the same at the outlet, but closer to the suction 54 (i.e., closer to the axis of the impeller 5), the shroud line 534 and the hub line 535 have a greater difference in the blade angle $\beta$, meaning that the twist degree of the blade increases, this particularly occurs at the 3-dimensional twisted front portion 530a near the leading edge 532 of the blade 53, thus the mold slides that are removed in a radial manner cannot be used to form the front portion 530a of this embodiment, the contents will be illustrated in the following paragraphs.

Figure 4D:
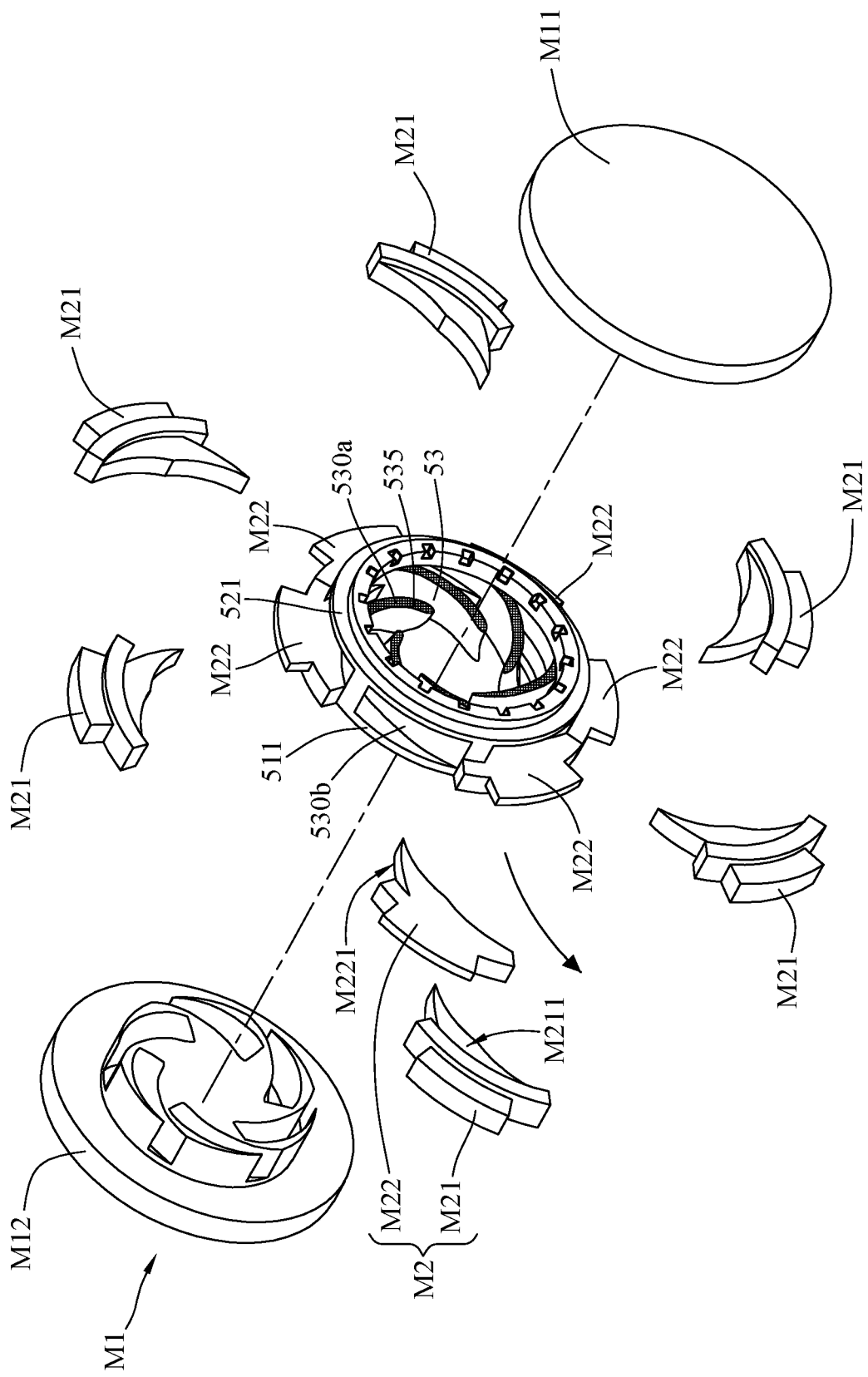
FIG. 4D illustrates an exploded view of the plastic impeller of the first embodiment of the disclosure and the molds for manufacturing the same.

Further, referring to FIG. 4D, an exploded view of the impeller 5 of the first embodiment of the disclosure and the molds for manufacturing the same is provided. In this embodiment and other embodiments, the molds for forming the impeller 5 within a single process can be divided into two units: a mold for twisted blade M1 and a mold for impeller outlet M2 shown in FIG. 4D. The mold for twisted blade M1 is configured to form the highly twisted front portions 530a (i.e., the twisted blade portions) between the hub hole 5210 of the hub rim part 521 and the shroud hole 5110 of the shroud rim part 511. In detail, the mold for twisted blade M1 includes, for example, a fixed die M11 and a moving die M12, the cooperation of the fixed die M11 and the moving die M12 is able to form the front portions 530a of these blades 53, since the shroud line 534 and the hub line 535 of the blade 53 at the front portion 530a have a greater difference in blade angle (i.e., the shroud line 534 and the hub line 535 of the blade 53 at the front portion 530a have a larger degree of non-overlapping on the grid-lines of the blade), thus the demolding of the fixed die M11 and the moving die M12 of the mold for twisted blade M1 is to axially remove the fixed die M11 and the moving die M12 respectively from the hub hole 5210 of the hub rim part 521 and the shroud hole 5110 of the shroud rim part 511 in opposite directions. Since the front portion 530a (i.e., the twisted blade portion) of each blade 53 is located between the shroud hole 5110 of the shroud rim part 511 and the hub hole 5210 of the hub rim part 521, axially removing the fixed die M11 and the moving die M12 along two opposite directions will not interfere with the blades 53, the shroud rim part 511, and the hub rim part 521. Herein, note that the disclosure is not limited to the positions, configurations, and features of the fixed die M11 and the moving die M12 shown in the drawings; for example, in some other embodiments, the positions of the fixed die M11 and the moving die M12 and features thereon can be switched.

In addition, since the shroud line 534 and the hub line 535 of the blade 53 on the rear portion 530b has a smaller difference in blade angle (i.e., on the grid-lines of the blade, the shroud line 534 and the hub line 535 of the blade 53 on the rear portion 530b have a lesser degree of non-overlapping), even in some other embodiments, the shroud line 534 and the hub line 535 of the blade 53 on the rear portion 530b may overlap with each other viewing from the grid-lines of the blade. As such, the mold for impeller outlet M2 may have a plurality of radially slidable mold slides or mold slide groups for integrally forming the rest portion (e.g., rear portion 530b) of the blade 53 other than the front portion 530a (i.e., the twisted blade portion).

Figure 4G:
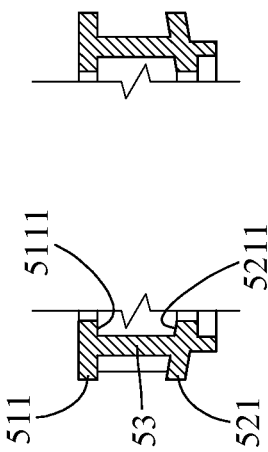
FIG. 4G is a partial enlarged side cross-sectional view of the variant of the plastic impeller of the first embodiment of the disclosure.
Figure 4F:
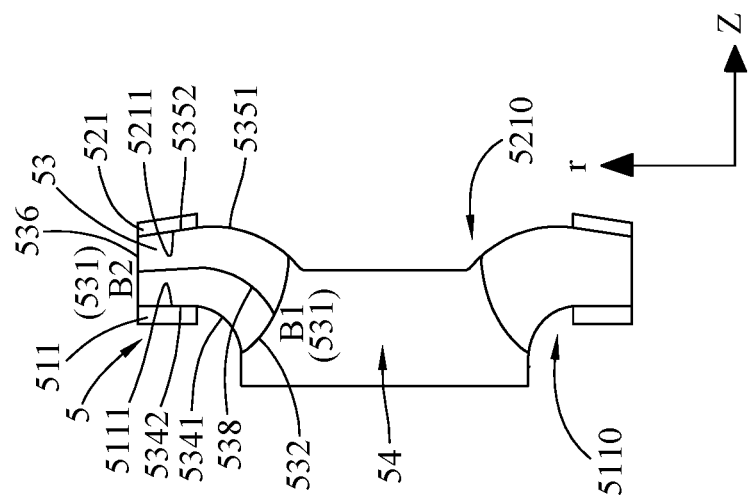
FIG. 4F is a side cross-sectional view of a variant of the plastic impeller of the first embodiment of the disclosure.
Figure 4E:
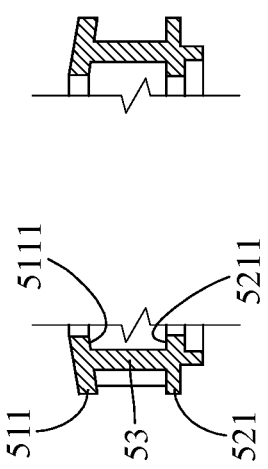
FIG. 4E is a partial enlarged side cross-sectional view of the plastic impeller of the first embodiment of the disclosure.

As shown in FIG. 4D and FIG. 4E, specifically, in this embodiment, the mold for impeller outlet M2 may include plural groups of mold slide sets respectively configured to form the portions of the flow channels near outlet (i.e., the space between the rear portions 530b of the blades 53, the shroud rim part 511, and the hub rim part 521), each mold slide set may include a hub slide M21 and a shroud slide M22, at least part of the hub slide M21 and at least part of the shroud slide M22 can be cooperated with each other to form the inner surface 5211 of the hub rim part 521, the inner surface 5111 of the shroud rim part 511, and the rear portions 530b of the blades 53, wherein the hub slide M21 has a hub slide surface M211 configured to form the inner surface 5211 of the hub rim part 521, and the shroud slide M22 has a shroud slide surface M221 configured to form the inner surface 5111 of the shroud rim part 511. In this embodiment, the surface element of the hub slide surface M211 of the hub slide M21 is a straight line so as to form a flat surface, thus, the inner surface 5211 of the hub rim part 521 can be formed to be a flat surface having a surface element being a straight line. The surface element of the shroud slide surface M221 of the shroud slide M22 is a curved line, thus the shroud slide surface M221 is a convex conical surface; in such a case, the inner surface 5111 of the shroud rim part 511 can be formed to be a concave conical surface having a surface element being a curved line. On the other hand, since the impeller 5 requires the surface element of the inner surface 5111 of the shroud rim part 511, being a curved line, and the surface element of the inner surface 5211 of the hub rim part 521, being a straight line, the aforementioned hub slide M21 and shroud slide M22 are required. According to this requirement, the hub slide M21 and the shroud slide M22 are removed one after another. Specifically, after the blades 53, the shroud rim part 511, and the hub rim part 521 had been formed, the hub slide M21 is first removed in radial direction, and then the space that was occupied by the hub slide M21 becomes available for the removal of the shroud slide M22 so that the shroud slide M22 can be easily removed without interfering with the rear portions 530b of the blades 53, the shroud rim part 511, and the hub rim part 521.

However, the geometrical shapes of the hub slide M21 and the shroud slide M22 can be modified according to actual requirements, and the disclosure is not limited thereto. For example, as shown in FIG. 4F and FIG. 4G, in a variant of the previous embodiment, the impeller 5 is required to have the surface element of the inner surface 5111 of the shroud rim part 511 to be a straight line and the surface element of the inner surface 5211 of the hub rim part 521 to be a curved line, correspondingly, the hub slide surface M211 of the hub slide M21 for forming the inner surface 5211 of the hub rim part 521 has a surface element which is a curved line, such that the inner surface 5211 of the hub rim part 521 can be formed to be a concave conical surface having a surface element of curved line; and the shroud slide surface M221 of the shroud slide M22 for forming the inner surface 5111 of the shroud rim part 511 has a surface element which is a straight line, such that the inner surface 5111 of the shroud rim part 511 can be formed to be a flat surface having a surface element of straight line. Similarly, the hub slide M21 and the shroud slide M22 are removed one after another. Specifically, after the blades 53 had formed, the shroud slide M22 is firstly removed in radial direction, and then the space that was occupied by the shroud slide M22 becomes available for the removal of the hub slide M21 so that the hub slide M21 can be easily removed without interfering with portions that had formed in the previous process, such as the rear portion 530b of the blades 53, the shroud rim part 511, and the hub rim part 521. In addition, note that the geometric configurations or the mating surfaces of the hub slide and the shroud slide can be modified according to actual requirements, and the disclosure is not limited thereto.

Further, referring to FIG. 5, the impeller 5 is assembled to a rotor 7. The impeller 5 includes the shroud 51, the hub 52 and the blades 53. As discussed above, the shroud 51 is formed by the aforementioned shroud rim part 511 and inner shroud 512. Referring to FIG. 4A and the FIG. 5, the inner shroud 512 is at the shroud hole 5110 of the shroud rim part 511 and can be assembled to the shroud rim part 511 and the blades 53 by heat welding, ultrasonic welding or other suitable ways. In addition, a wear ring seat 512a is disposed on the inner shroud 512 and is configured for the installation of a wear ring 8. The hub 52 is formed by the aforementioned hub rim part 521 and inner hub 522. Referring to FIG. 4A and FIG. 5, the inner hub 522 is located at the hub hole 5210 of the hub rim part 521 and can be assembled to the hub rim part 521 and the blades 53 by heat welding, ultrasonic welding or other suitable ways. In addition, a power transmission seat 521a is disposed on the hub rim part 521 and is configured for being installed to the rotor 7.

Figure 6A:
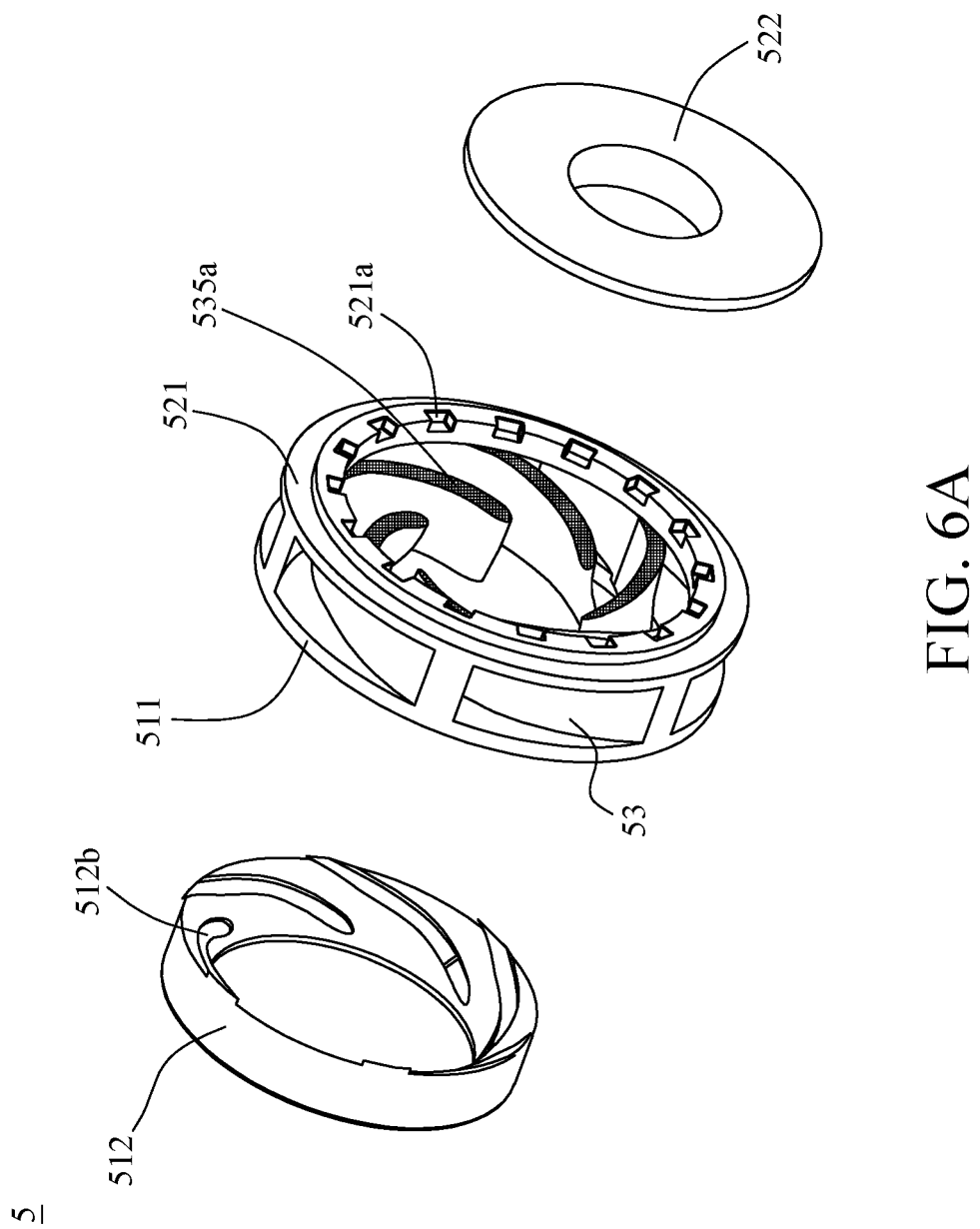
FIGS. 6A-6B illustrate exploded views of the plastic impeller of the first embodiment of the disclosure, taken from different angles.
Figure 6B:
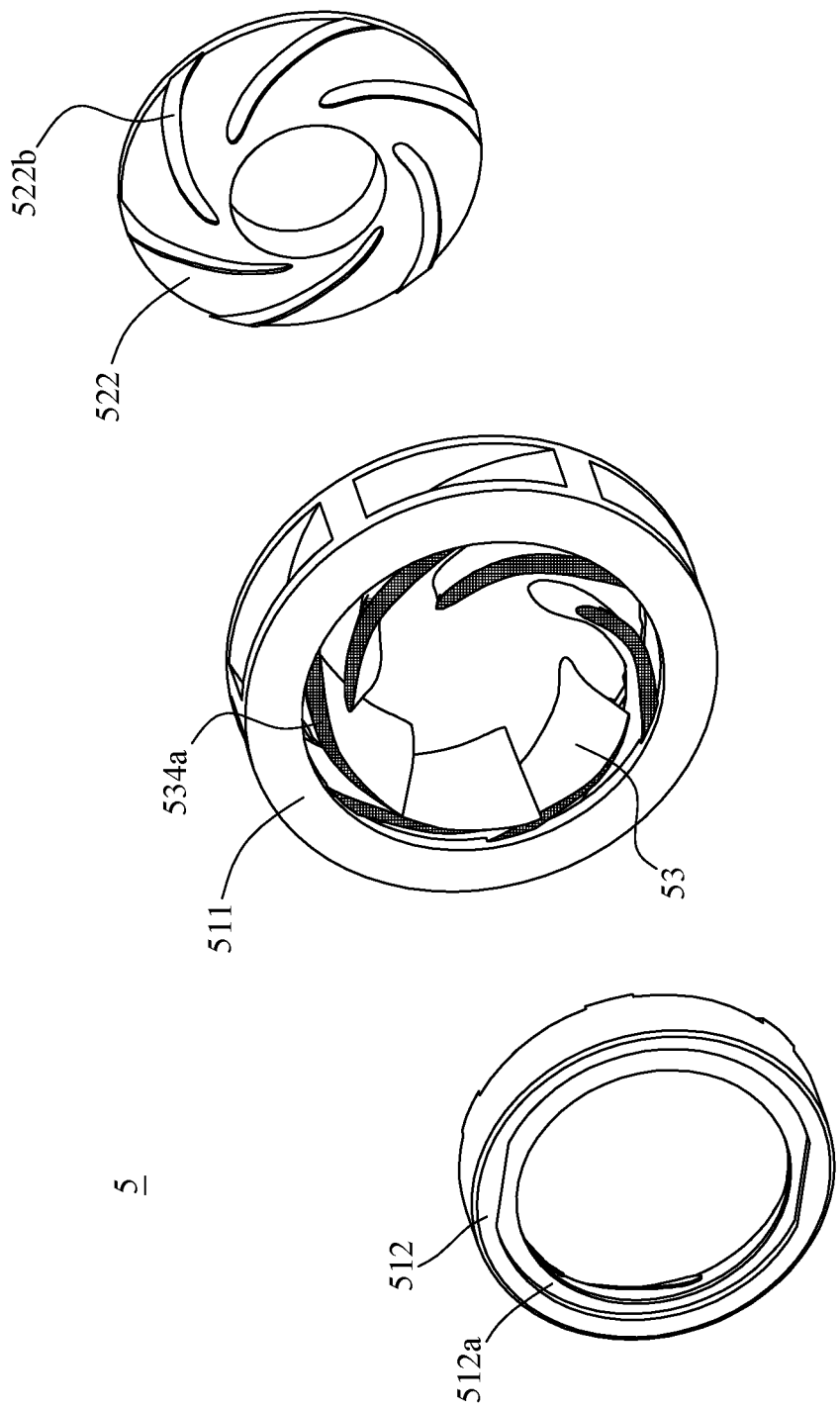
Figure 7A:
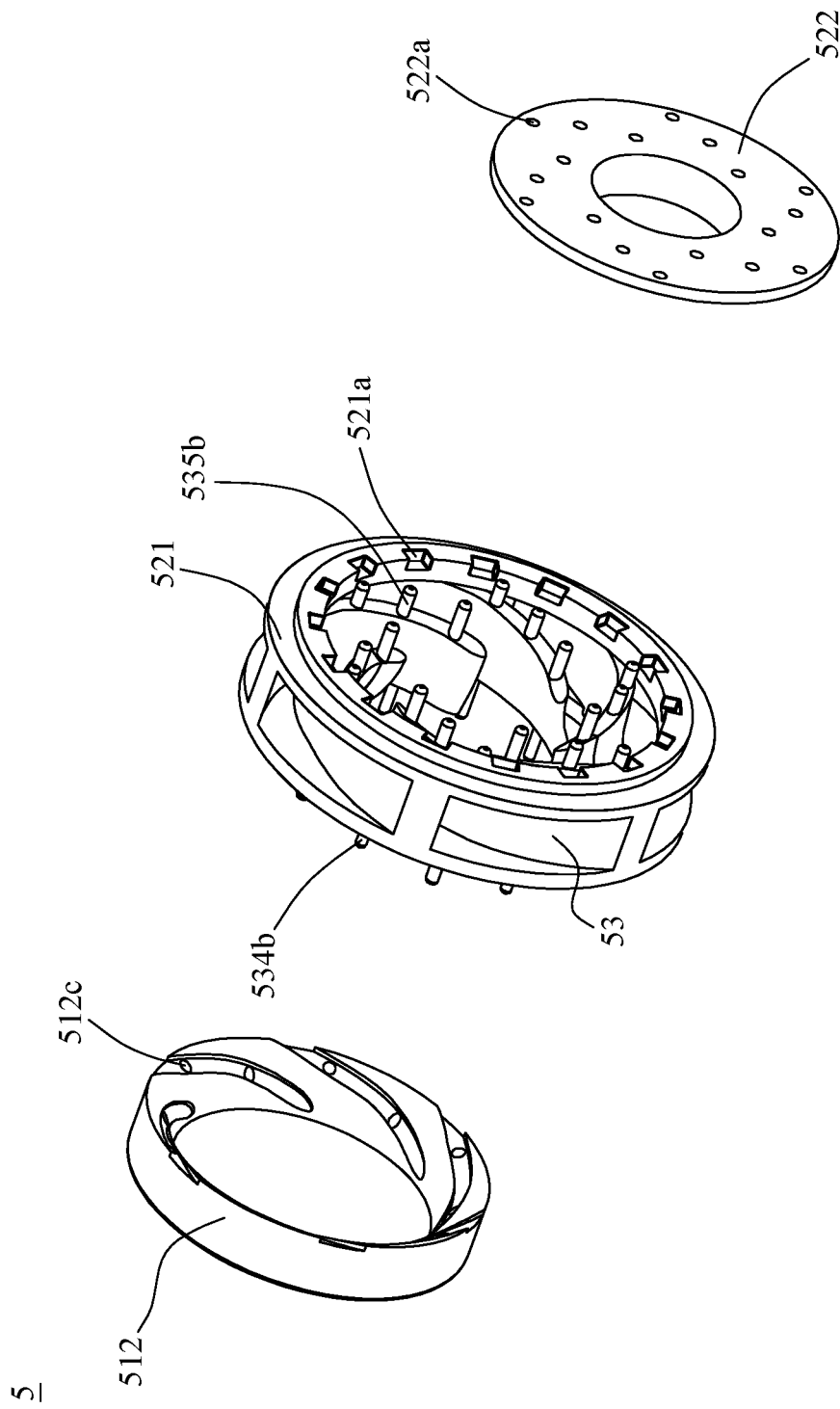
FIGS. 7A-7B illustrate exploded views of the plastic impeller of the first embodiment of the disclosure, taken from different angles.
Figure 7B:
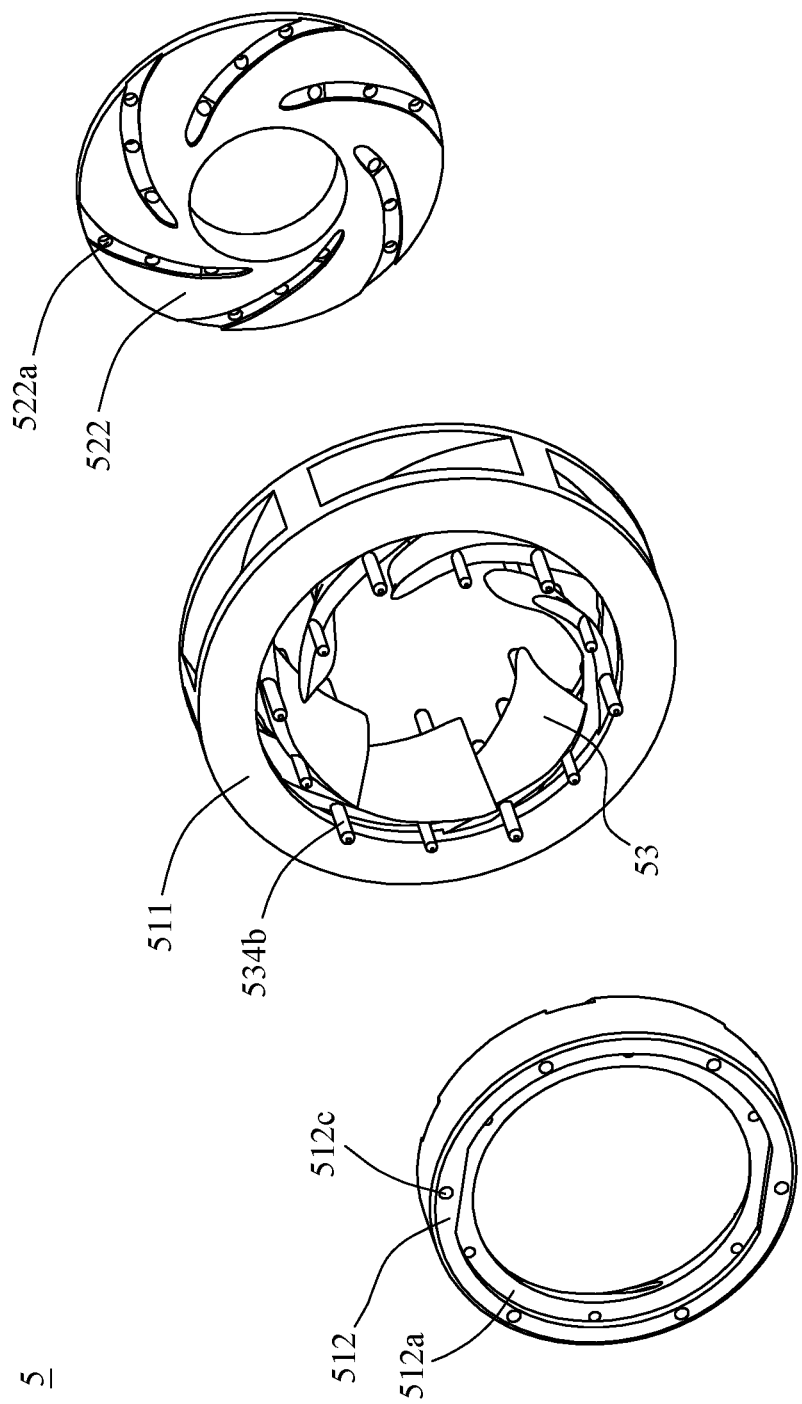

The inner shroud 512 and the inner hub 522 in FIG. 5 can be additionally produced by using simple molds, the inner shroud 512 and the inner hub 522 are respectively connected to the first shroud line 5341 and the first hub line 5351 of each blade 53 so as to be assembled to the shroud rim part 511, the hub rim part 521 and the blades 53 and thereby together forming a complete 3-dimensional plastic impeller. For example, FIGS. 6A-6B illustrate exploded views of the impeller 5 of the first embodiment of the disclosure, taken from different angles, the welding segment 512b of the inner shroud 512 can be joined to the welding segments 534a of the blades 53 by heat welding, ultrasonic welding or other suitable ways; in a similar manner, the welding segment 522b of the inner hub 522 can be joined to the welding segments 535a of the blades 53 by heat welding, ultrasonic welding or other suitable ways. Alternatively, FIG. 7A-7B also illustrate exploded views of the impeller 5 of the first embodiment of the disclosure, taken from different angles, the inner shroud 512 may have melting holes 512c for the melting rods 534b to be inserted therein, the melting rods 534b can be heated to be joined with the melting holes 512c. Similarly, the inner hub 522 may have melting holes 522a for the melting rods 535b of the blades 53 to be inserted therein, the melting rods 535b can be heated to be joined with the melting holes 522a. Accordingly, the inner shroud 512 and the inner hub 522 are not produced by the molding process of forming the shroud rim part 511, the hub rim part 521, and the blades 53 into a single piece.

Referring to FIG. 5, the power of the pump is transmitted via the power transmission seat 521a and the hub rim part 521 and then to the blades 53, since these three portions are formed in a single piece at the same molding process; that is, the blades 53, the hub rim part 521, and the power transmission seat 521a thereof have no seams, joints, or junction caused by any other processes among them. Therefore, there are no seams or structural discontinuity among the blades 53, the hub rim part 521, and the power transmission seat 521a, thus the single piece formed by these portions has high structural strength. As such, the hub rim part 521 is able to be employed to receive the main loading or power transmission of the pump, helping to expand the application range of the pump. In addition, although the inner shroud 512 and the inner hub 522 are formed by using simple molds and then assembled to other parts to form a complete impeller by heat welding, ultrasonic welding or other suitable ways, the inner shroud 512 and the inner hub 522 are merely employed to restrict the fluid in the range of the impeller 5 but not employed to directly receive the main load or power transmission of the pump, thus the way of forming the inner shroud 512 and the inner hub 522 does not affect the structural strength of the pump. As a result, the impeller 5 of this embodiment is able to operate at various applications under conditions, such as high temperature (e.g., 200° C.) and high load.

Second Embodiment

Figure 8B:
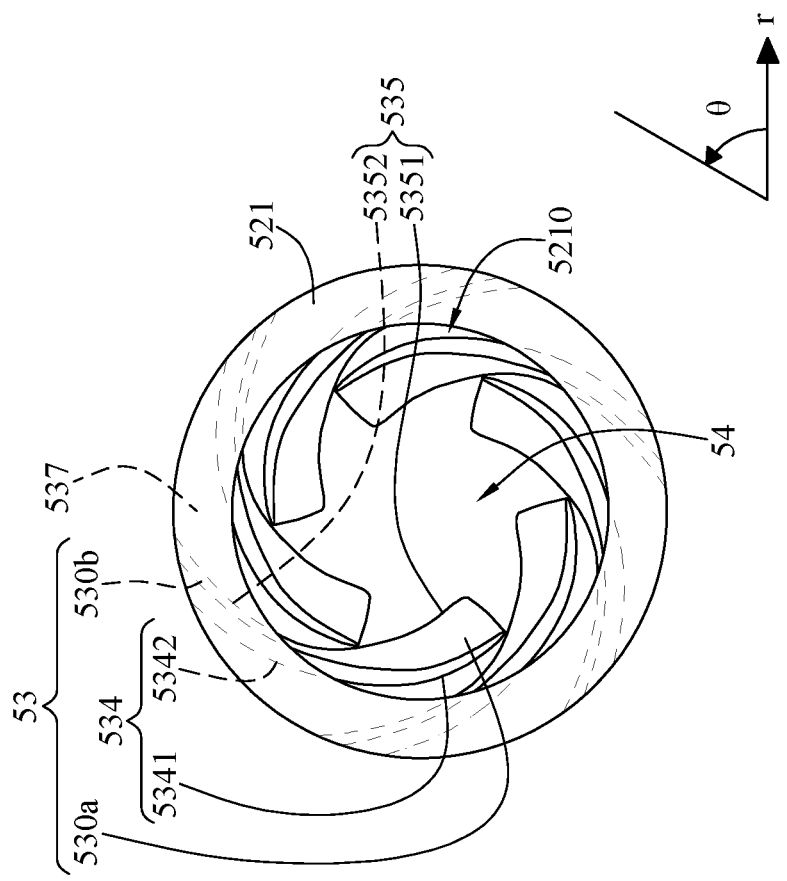
FIG. 8B is a top view of the plastic impeller in FIG. 8A.
Figure 8A:
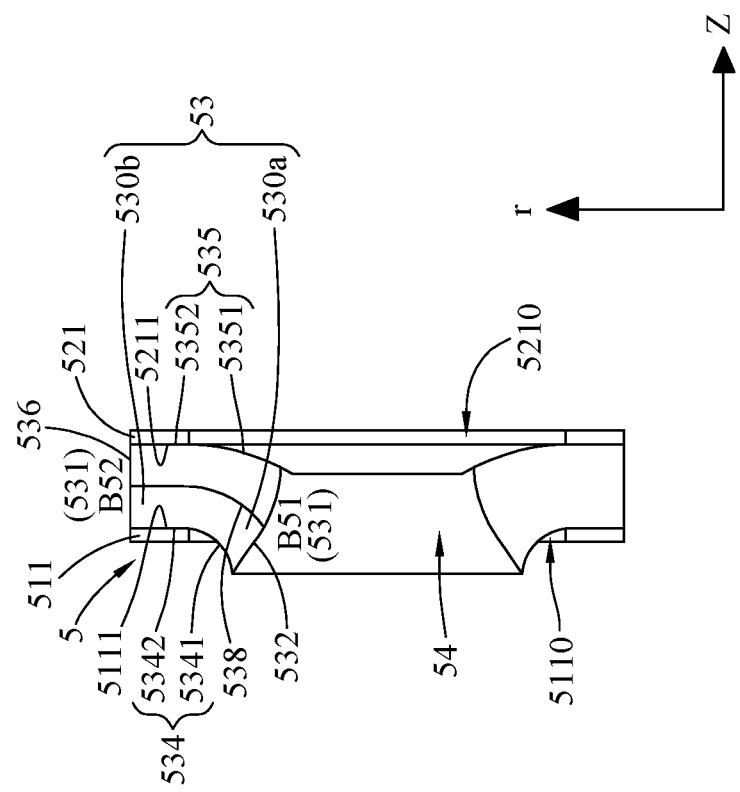
FIG. 8A is a side cross-sectional view of a plastic impeller according to a second embodiment of the disclosure.
Figure 8C:
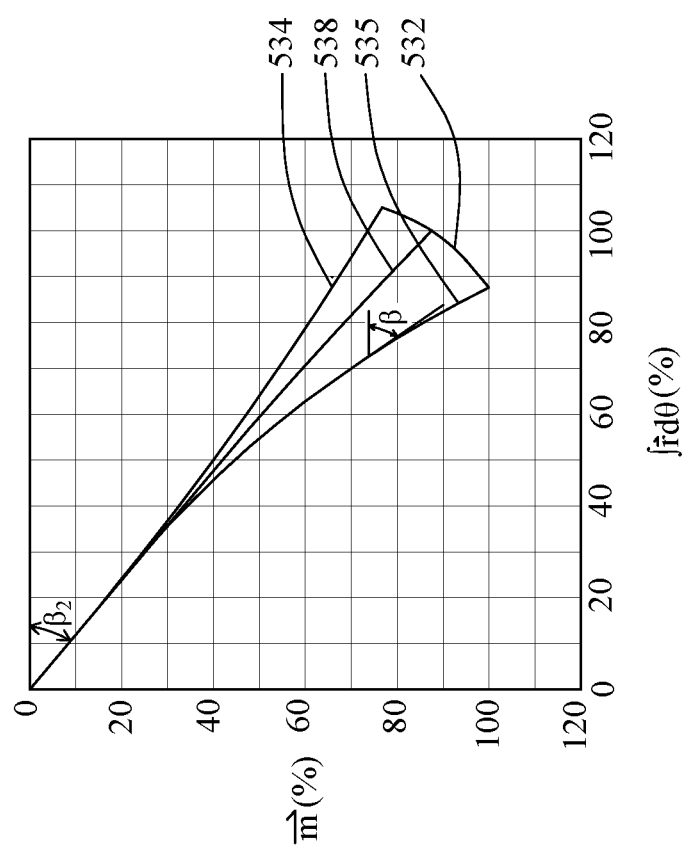
FIG. 8C shows a grid-lines of the blade in FIG. 8A.
Figure 9:
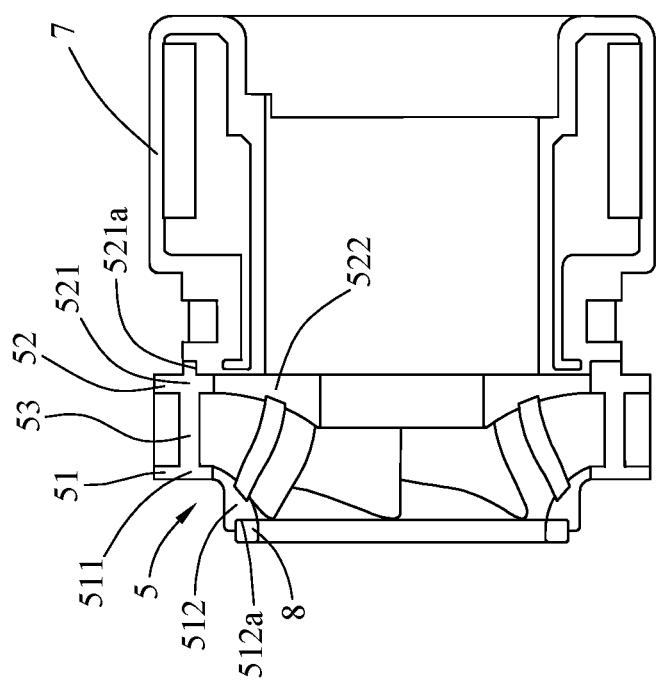
FIG. 9 is an assembly cross-sectional view of the plastic impeller of the second embodiment of the disclosure.

Referring to FIGS. 8A-8C and FIG. 9, FIG. 8A is a side cross-sectional view of an impeller 5 according to a second embodiment of the disclosure, FIG. 8B is a top view of the impeller 5 in FIG. 8A, FIG. 8C shows a grid-lines of the blade 53 in FIG. 8A, FIG. 9 is an assembly cross-sectional view of the impeller 5 of the second embodiment of the disclosure. As shown in the figures, the main differences between this embodiment and the previous embodiments are: the meridional width 531 of the blade 53 of the second embodiment decreases in a direction pointing from the inlet width B51 to the portion between the front portion 530a and the rear portion 530b, the shroud rim part 511 has an inner surface 5111 whose surface element on the r_z plane is a straight line parallel to the r-axis and thus forming a flat surface, in other words, the inner surface 5111 is a 2-dimensional annular flat surface; the hub rim part 521 has an inner surface 5211 whose surface element on the r_z plane is a straight line parallel to the r-axis and thus forming a flat surface, in other words, the inner surface 5211 is a 2-dimensional annular flat surface. That is, the inner surface 5111 and the inner surface 5211 are parallel to each other, thus the meridional width 531 does not change in a direction pointing from to the portion between the front portion 530a and the rear portion 530b toward the outlet width B52, and the second shroud line 5342 and the second hub line 5352 are substantially parallel to each other on the r_z plane. That is, in this embodiment, the meridional width 531 of the front portion 530a of the blade 53 decreases in a direction pointing from the inlet width B51 toward the outlet width B52 along the mean line 538, but the meridional width 531 of the rear portion 530b of the blade 53 does not change along the mean line 538. As shown in FIG. 8B, the leading edge 532, the shroud line 534, and the hub line 535 do not overlap with each other at the front portion 530a of the blade 53, and the shroud line 534 and the hub line 535 do not overlap with each other at the rear portion 530b of the blade 53.

In addition, on the grid-lines of the blade 53 shown in FIG. 8C, the outlet blade angles are the same, in the range from the portion between the front portion 530a and the rear portion 530b to the trailing edge 536, the second shroud line 5342 and the second hub line 5352 have a difference in blade angle β within 10 degrees. Therefore, the mold for the impeller outlet in this embodiment can be modified to be a single mold slide that can be removed in the radial direction.

Figure 8D:
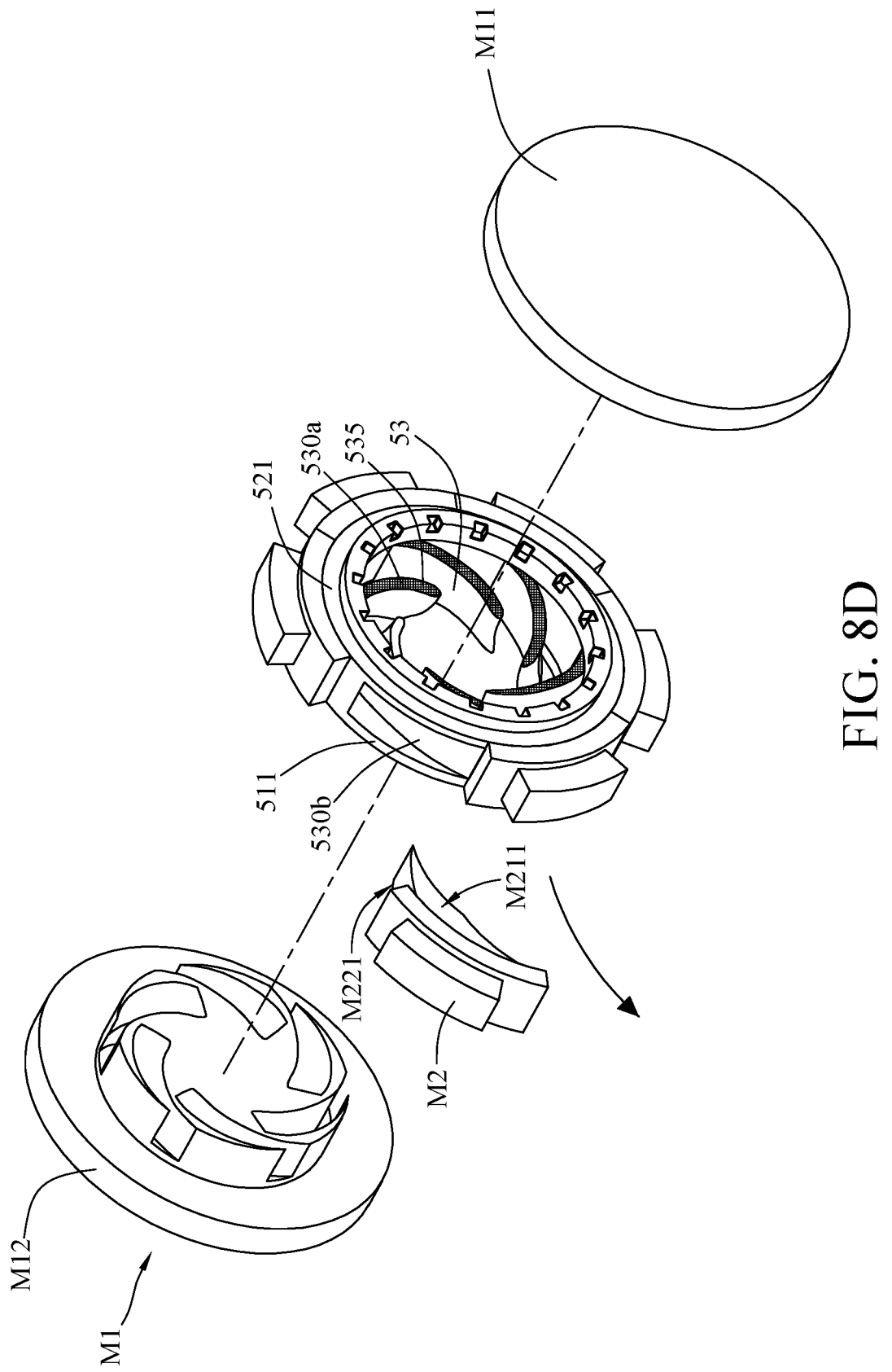
FIG. 8D illustrates an exploded view of the plastic impeller of the second embodiment of the disclosure and the molds for manufacturing the same

In detail, further referring to FIG. 8D, an exploded view of the impeller of this embodiment and the molds for manufacturing the same is illustrated. In this embodiment, the shroud rim part 511 and the hub rim part 521 are substantially parallel to each other on the r_z plane (meridional plane), that is, the inner surfaces of the shroud rim part 511 and the hub rim part 521 facing towards each other are parallel to each other, thus the space between the shroud rim part 511 and the hub rim part 521 does not increase in width from the outside towards the inside. Therefore, comparing to the aforementioned FIG. 4D, the mold for impeller outlet M2 of this embodiment may be a single mold slide with a uniform thickness and capable of being radially removed, and the hub slide surface M211 and the shroud slide surface M221 of the single mold slide for forming the inner surface 5211 of the hub rim part 521 and the inner surface 5111 of the shroud rim part 511 have surface elements both being a straight line. By this configuration, the mold for impeller outlet M2 is able to be removed in the radial direction on the r_z plane (meridional plane). Also, the shroud rim part 511 and the hub rim part 521 are parallel viewing from the r_z plane (meridional plane), the sector width 537 increases as the radius increases on the r_θ plane, thus the demolding of the mold for impeller outlet does not lead to interference.

Third Embodiment

Figure 10C:
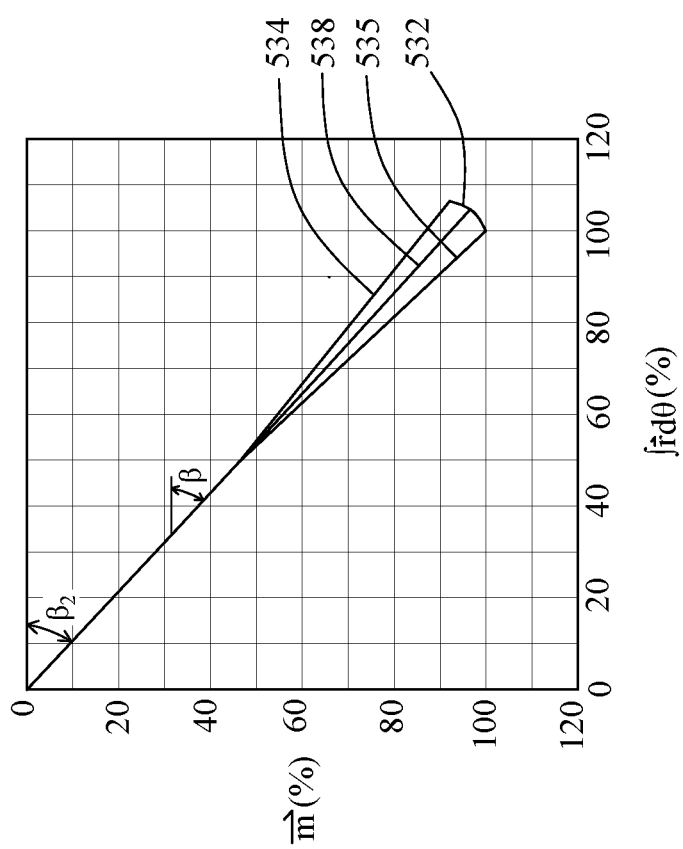
FIG. 10C shows a grid-lines of the blade in FIG. 10A.
Figure 11:
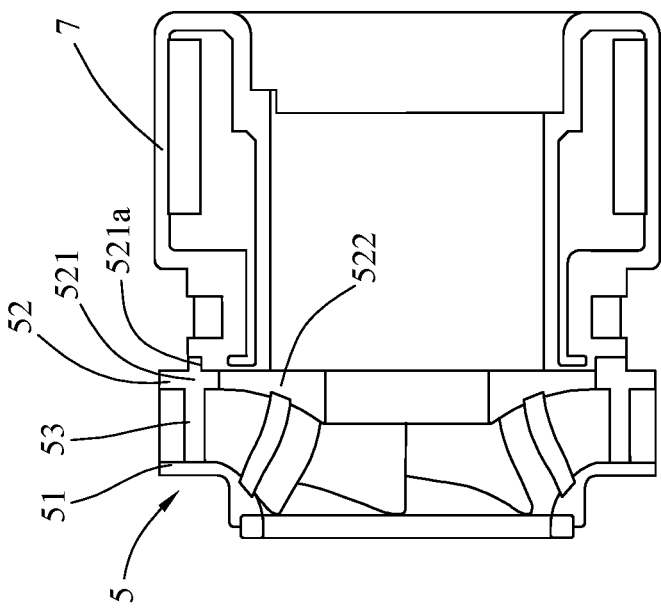
FIG. 11 is an assembly cross-sectional view of the plastic impeller of the third embodiment of the disclosure.

Referring to FIGS. 10A-10C and FIG. 11, FIG. 10A is a side cross-sectional view of an impeller 5 according to a third embodiment of the disclosure, FIG. 10B is a top view of the impeller 5 in FIG. 10A, FIG. 10C shows a grid-lines of the blade 53 in FIG. 10A, FIG. 11 is an assembly cross-sectional view of the impeller 5 of the third embodiment of the disclosure.

The main differences between this embodiment and the previous embodiments are: the third embodiment is for the impeller 5 of pump with a lower flow rate, higher head, and lower specific speed, wherein the impeller 5 may not have the aforementioned shroud rim part 511, and the blade 53 only requires 3-dimensional twisted geometry at the front portion 530*a*, and the rear portion 530*b* of the blade 53 may have a 2-dimensional blade geometry. Specifically, the first shroud line 5341 and the first hub line 5351 are different in blade angle (i.e., the first shroud line 5341 and the first hub line 5351 do not overlap with each other on the grid-lines of the blade), but the second shroud line 5342 and the second hub line 5352 may be the same in blade angle (i.e., the second shroud line 5342 and the second hub line 5352 may overlap with each other on the grid-lines of the blade). The hub rim part 521 has an inner surface 5211, the surface element of the inner surface 5211 is a straight line parallel to r axis on the r_z plane.

In addition, on the grid-lines of the blade in FIG. 10C, the rear portion 530*b* of the blade 53, the shroud line 534, the mean line 538, and the hub line 535 are the same in blade angle β.

Figure 10D:
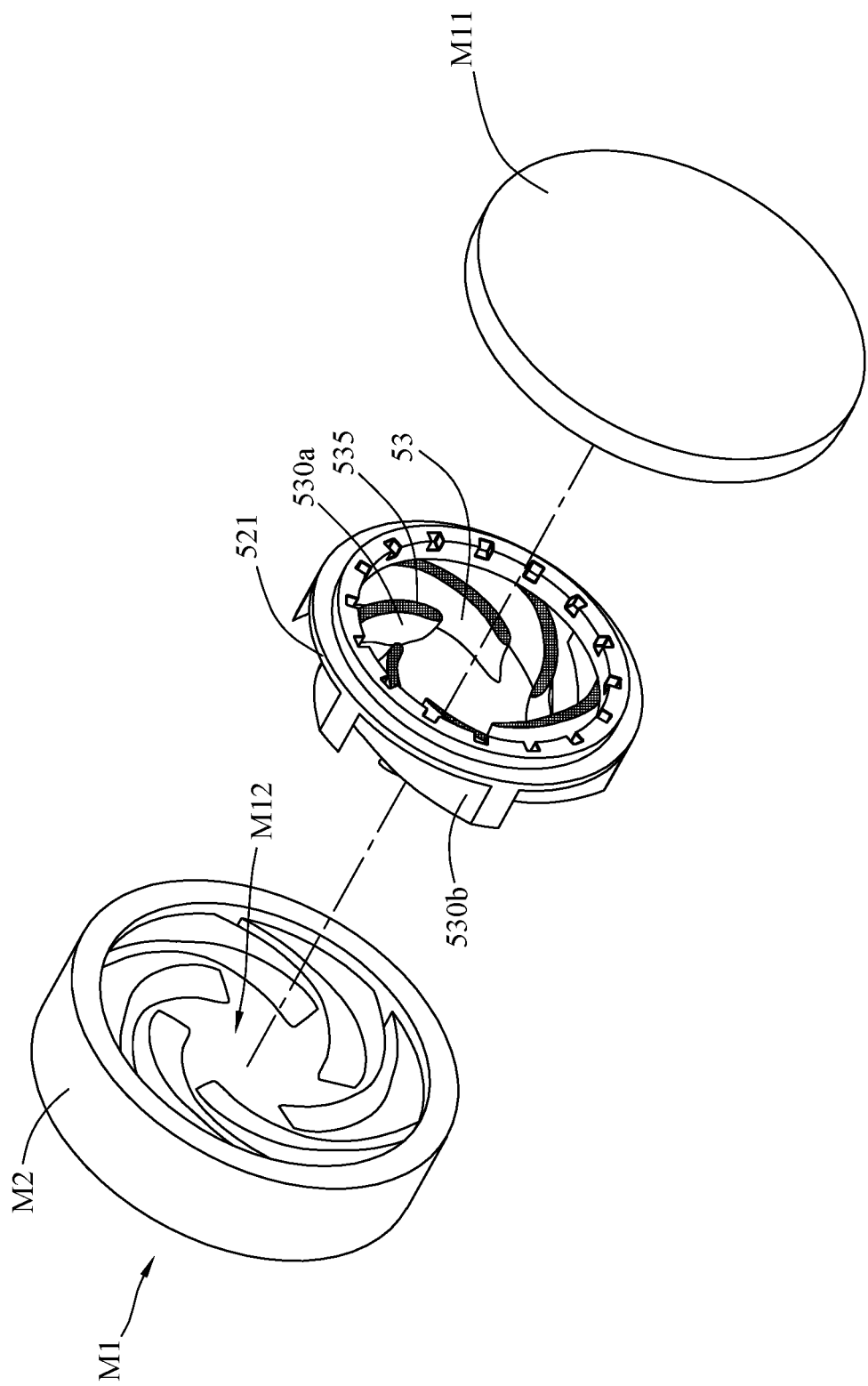
FIG. 10D illustrates an exploded view of the plastic impeller of the third embodiment of the disclosure and the molds for manufacturing the same.

Therefore, in this embodiment, the mold for the impeller outlet for forming the rear portion 530*b* of the blade 53 has no need to be radially removed but can be axially removed similar to the process in removing the mold for twisted blade for forming the front portion 530*a* of the blade 53. In detail, further referring to FIG. 10D, FIG. 10D illustrates an exploded view of the impeller of this embodiment and the molds for manufacturing the same. In this embodiment, since the impeller 5 does not have the shroud rim part 511, the side of the blades 53 away from the hub rim part 521 is not covered, and the rear portion 530*b* of the blade 53 is a 2-dimensional blade geometry, thus, the moving die M12 of the mold for twisted blade M1 for forming the twisted front portion 530*a* (i.e., the twisted blade portion) can be integrally formed with the mold for impeller outlet M2 for forming the rear portion 530*b*, and they can be axially removed along a direction away from the hub rim part 521 without interfering with the blades 53 during the removal.

Regarding the shroud 51, the shroud rim part 511 and the inner shroud 512 can be formed of a single piece by using simple molds, and then the shroud 51 can be connected to the blades 53 by heat welding, ultrasonic welding or other suitable ways so as to form a complete impeller 5.

Fourth Embodiment

Figure 12:
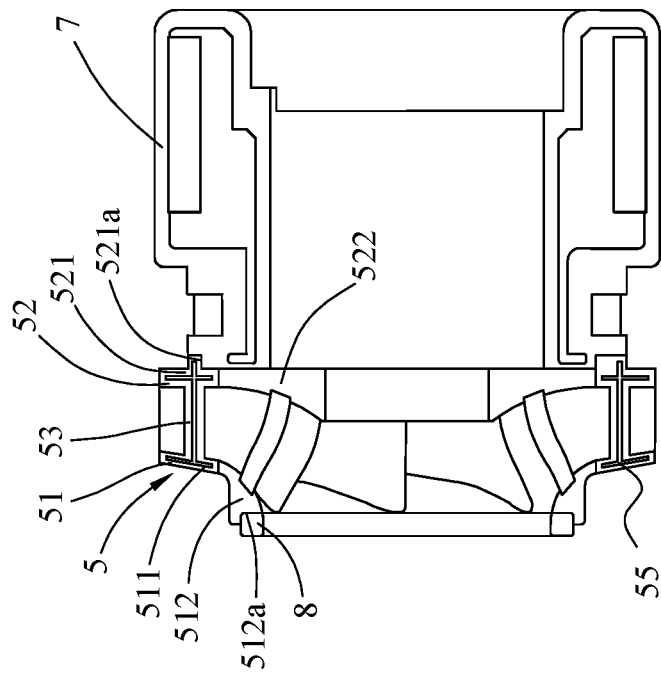
FIG. 12 is an assembly cross-sectional view of a plastic impeller according to a fourth embodiment of the disclosure.

Referring to FIG. 12, FIG. 12 is an assembly cross-sectional view of an impeller 5 according to a fourth embodiment of the disclosure. The main differences between this embodiment and the previous embodiments are: reinforcing metal 55 is embedded in the blades 53, the hub rim part 521, and the shroud rim part 511 of the impeller 5, the reinforcing metal 55 is configured to improve the rigidity of the overall structure, allowing the plastic impeller to work stably at high temperature (200° C.) and high load without failure. Note that, in some other embodiments, the shroud rim part 511 may not contain the reinforcing metal 55; that is, in such a case, in the impeller 5, the reinforcing metal 55 is only embedded in the blades 53 and the hub rim part 521.

Accordingly, the manufacturing method of the 3-dimensional plastic impeller for centrifugal pump and the impeller manufactured thereby as disclosed in the previous embodiments of the disclosure at least can achieve the following effects: 1. Each part can be produced using mold and can be automatically demolded, having production value; 2. The twisted blade portions can be formed by using a removable and separable fixed die and moving die, and the 3-dimensional twisted blade geometry helps improve pump performance; 3. The blades and the hub rim part are formed in a single piece at the same molding process and thus having a higher structural strength, the hub rim part directly transmits torque to the blades, which helps the impeller to operate at high working temperature (e.g., approximately 200° C.) or high load without being damaged.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A manufacturing method of a die-formed 3-dimensional plastic impeller of a centrifugal pump, characterized in that,
    a hub of the impeller comprises a hub rim part and an inner hub, the hub rim part has a hub hole, a shroud of the impeller comprises a shroud rim part and an inner shroud, the shroud rim part has a shroud hole, a plurality of blades of the impeller each have a twisted blade portion located between the hub hole of the hub rim part and the shroud hole of the shroud rim part;
    using a mold for twisted blade and a mold for impeller outlet to form the impeller;
    the mold for twisted blade comprises a fixed die and a moving die, using the fixed die and the moving die placed through the hub hole and the shroud hole to form the twisted blade portions, wherein the twisted blade portions are arranged in circle at a central portion of the shroud and the hub and are formed above the central portion;

using the mold for impeller outlet to integrally form one or more portions of the blades other than the twisted blade portions as well as the hub rim part used to bear power transmission;

wherein the shroud hole of the shroud rim part and the hub hole of the hub rim part are respectively configured for the inner hub and the inner shroud to be disposed thereto by heat welding or melting rods, thereby together forming the impeller.

2. The manufacturing method according to claim 1, characterized in that, the hub rim part comprises a power transmission seat.

3. The manufacturing method according to claim 1, characterized in that, the mold for impeller outlet has a hub slide and a shroud slide that are radially slidable, the hub slide has a hub slide surface configured for forming an inner surface of the hub rim part facing towards the shroud rim part, and the shroud slide has a shroud slide surface configured to form an inner surface of the shroud rim part facing towards the hub rim part, the hub slide surface is a flat surface configured to form the inner surface of the hub rim part to be a flat surface, and the shroud slide surface is a convex conical surface configured to form the inner surface of the shroud rim part to be a concave conical surface.

4. The manufacturing method according to claim 1, characterized in that, the mold for impeller outlet has a hub slide and a shroud slide that are radially slidable, the hub slide has a hub slide surface configured to form an inner surface of the hub rim part facing towards the shroud rim part, and the shroud slide has a shroud slide surface configured to form an inner surface of the shroud rim part facing towards the hub rim part, the hub slide surface is a convex conical surface configured to form the inner surface of the hub rim part to be a concave conical surface, and the shroud slide surface is a flat surface configured to form the inner surface of the shroud rim part to be a flat surface.

5. The manufacturing method according to claim 1, characterized in that, a shroud line and a hub line of the one or more portions of each of the blades other than the twisted blade portion are the same in blade angle, the mold for impeller outlet and the moving die are in a single piece, and the hub rim part and the blades are formed in a single piece at the same molding process.

6. The manufacturing method according to claim 1, characterized in that, a shroud line and a hub line of the one or more portions of each of the blades other than the twisted blade portion are different in blade angle, the shroud rim part and the hub rim part are parallel to each other, and the mold for impeller outlet only provides a single radially mold slide in a space between any two of the blades adjacent to each other.

7. A die-formed 3-dimensional plastic impeller of a centrifugal pump, characterized in that, the 3-dimensional plastic impeller comprises:

a shroud, a hub, and a plurality of blades, together form flow channel in the impeller for working fluid, the shroud and the hub are configured to restrict a flow path of the working fluid, the hub is configured to transmit torque to the blades, each of the blades has a 3-dimensional twisted shape configured to improve pump efficiency, characterized in that:

each of the blades comprises a front portion, a rear portion connected to the front portion, a shroud line connected to the shroud, and a hub line connected to the hub, wherein the shroud line comprises a first shroud line and a second shroud line, the hub line comprises a first hub line and a second hub line, the first shroud line and the first hub line are located on the front portion, the second shroud line and the second hub line are located on the rear portion, and the first shroud line and the first hub line are different in blade angle;

the hub comprises a hub rim part and an inner hub, the hub rim part has a hub hole, and the hub rim part has a power transmission seat configured to transmit torque to the blades;

the shroud comprises a shroud rim part and an inner shroud, the shroud rim part has a shroud hole;

the front portion of each of the blades is located between the hub hole of the hub rim part and the shroud hole of the shroud rim part;

the rear portions of the blades and the hub rim part are formed in a single piece at the same molding process, and the rear portions of the blades are connected to the shroud rim part; and the inner shroud and the inner hub are respectively installed in the shroud hole and the hub hole so as to be combined with the front portions of the blades.

8. The 3-dimensional plastic impeller according to claim 7, characterized in that, the shroud is configured for a wear ring to be installed thereon.

9. The 3-dimensional plastic impeller according to claim 7, characterized in that, the second shroud line and the second hub line of each of the blades are the same in blade angle.

10. The 3-dimensional plastic impeller according to claim 7, characterized in that, the shroud rim part and the inner shroud are formed in a single piece.

11. An impeller of centrifugal pump, characterized in that, the impeller comprises:

a hub comprising a hub rim part and an inner hub, wherein the hub rim part has a hub hole, the inner hub is installed at the hub hole; and a plurality of blades, being arranged along the hub rim part, wherein the blades each comprises a front portion and a rear portion connected to each other, the front portion is a 3-dimensional twisted blade portion located at the hub hole and connected to the hub rim part via the rear portion, and each of the rear portions has a second shroud line and a second hub line which are different in blade angle;

wherein the hub rim part and the blades are formed in a single piece at the same molding process, the 3-dimensional twisted blade portions and the hub rim part do not overlap with each other, and the hub hole of the hub rim part and the inner hub are disposed by heat welding or melting rods, thereby together forming the impeller.

12. The impeller according to claim 11, characterized in that, each of the front portions has a first shroud line and a first hub line, the inner hub is connected to the hub rim part and the first hub line of each of the blades.

13. The impeller according to claim 11, characterized in that, further comprises a reinforcing metal embedded in the hub rim part and the blades.

* * * * *